(12) United States Patent
Kudo et al.

(10) Patent No.: US 6,413,479 B1
(45) Date of Patent: Jul. 2, 2002

(54) REFORMING APPARATUS FOR MAKING A CO-REDUCED REFORMED GAS

(75) Inventors: Hitoshi Kudo; Noriyuki Yamaga, both of Hirakata; Mikio Shinagawa, Neyagawa, all of (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/214,001

(22) PCT Filed: Jun. 30, 1997

(86) PCT No.: PCT/JP97/02265

§ 371 (c)(1),
(2), (4) Date: Feb. 8, 1999

(87) PCT Pub. No.: WO98/00361

PCT Pub. Date: Jan. 8, 1998

(30) Foreign Application Priority Data

Jun. 28, 1996 (JP) .............................................. 8-170483

(51) Int. Cl.[7] ................................................. C01B 3/22

(52) U.S. Cl. ...................... 422/198; 48/61; 48/199 FM; 208/133; 422/188; 423/651

(58) Field of Search ................. 48/61, 197 R, 48/199 R, 199 FM, 214 A; 208/133, 134, 135, 136, 137, 138, 141; 422/188, 189, 190, 193, 194, 198; 423/650, 651, 652, 655; 429/13, 17, 19

(56) References Cited

U.S. PATENT DOCUMENTS

| | | | |
|---|---|---|---|
| 5,226,928 A | 7/1993 | Makabe et al. | ................ 48/94 |
| 5,458,857 A | 10/1995 | Collins et al. | .............. 422/198 |
| 5,658,681 A | 8/1997 | Sato et al. | ................... 429/13 |

FOREIGN PATENT DOCUMENTS

| | | |
|---|---|---|
| EP | 199 878 A2 * | 11/1986 |
| EP | 0199878 | 11/1986 |

(List continued on next page.)

OTHER PUBLICATIONS

An English Language abstract of JP 7–126001.
An English Language abstract of JP 6–219704.
An English Language abstract of JP 1–183401.

(List continued on next page.)

*Primary Examiner*—Jerry D. Johnson
*Assistant Examiner*—Frederick Varcoe
(74) *Attorney, Agent, or Firm*—Greenblum & Bernstein, P.L.C.

(57) ABSTRACT

This reforming apparatus is provided with a raw material reforming unit including a heat source for generating heat when a fuel gas is burnt and adapted to reaction heat directly from the heat source, steam-reform a material, and produce a reformed gas containing hydrogen as a main component, a shift reaction unit for reducing by a water shift reaction the amount of CO contained in the reformed gas produced in the raw material reforming unit, a CO oxidation unit adapted to further reduce the amount of CO contained in the reformed gas after the process in the shift reaction unit, by oxidizing the same. These units are united as independent units. These raw material reforming unit, shift reaction unit and CO oxidation unit are arranged so that the shift reaction unit and the CO oxidation unit are indirectly heated by the heat transmitted from the heat source of the raw material reforming unit. The indirect heating is conducted by a method of heat transmission in solid by which heat is transmitted from the outer faces of the combustion chamber via an intermediate member; a method utilizing radiant heat, and a method utilizing heat of a combustion exhaust gas discharged from the combustion chamber. Since this reforming apparatus is provided with these three independent reaction sections united together, it can be miniaturized, and the heat from the heat source can be utilized effectively, and the controlling of temperature in the reaction sections can be done excellently.

29 Claims, 20 Drawing Sheets

FOREIGN PATENT DOCUMENTS

| | | |
|---|---|---|
| EP | 435642 | 7/1991 |
| EP | 533232 | 3/1993 |
| EP | 600621 | 6/1994 |
| JP | 61247601 | 11/1986 |
| JP | 1183401 | 7/1989 |
| JP | 1282113 | 11/1989 |
| JP | 4170301 | 6/1992 |
| JP | 5251104 | 9/1993 |
| JP | 6219704 | 8/1994 |
| JP | 07126001 A * | 5/1995 |
| JP | 7126001 | 5/1995 |
| JP | 8-106914 | 4/1996 |
| WO | 98/00878 | 1/1998 |

OTHER PUBLICATIONS

An English Language abstract of JP1–282113.
An English Language abstract of JP 4–170301.
An English Language abstract of JP 5–251104.
Patent Abstract of Japan, vol. 1996 No. 08 Aug. 30, 1996, Abstract of JP–A–8–106914.

* cited by examiner

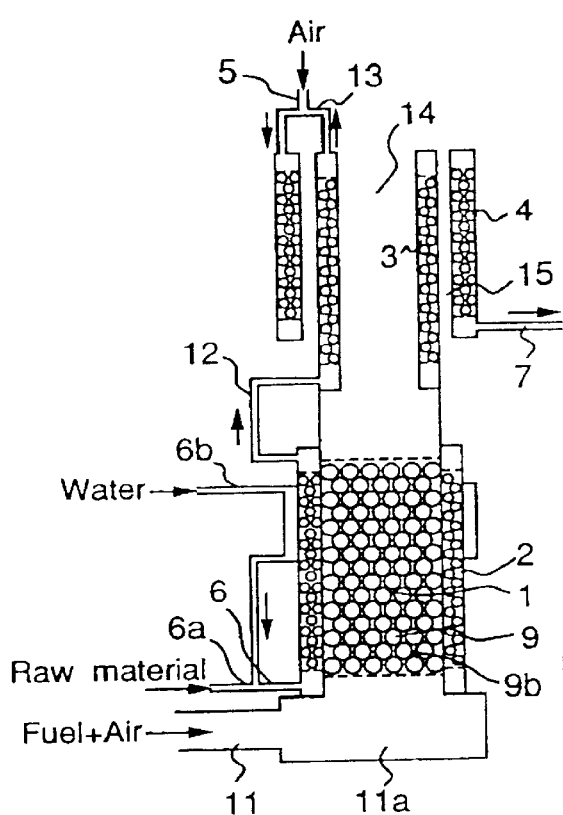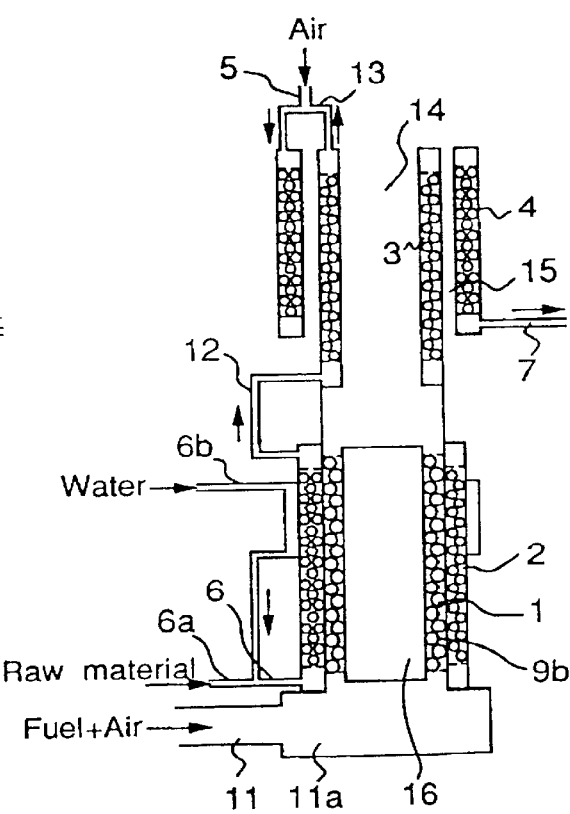

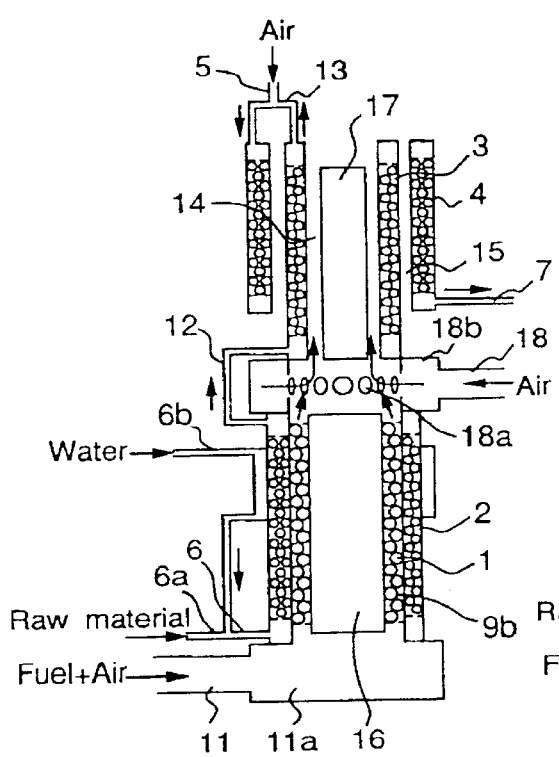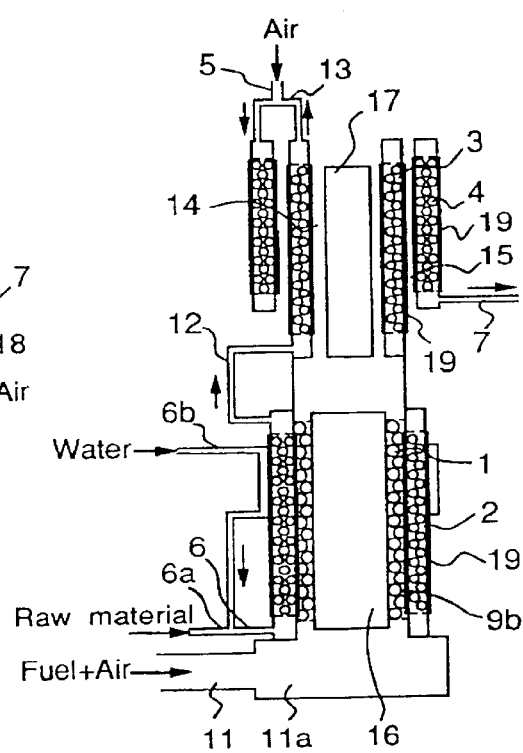

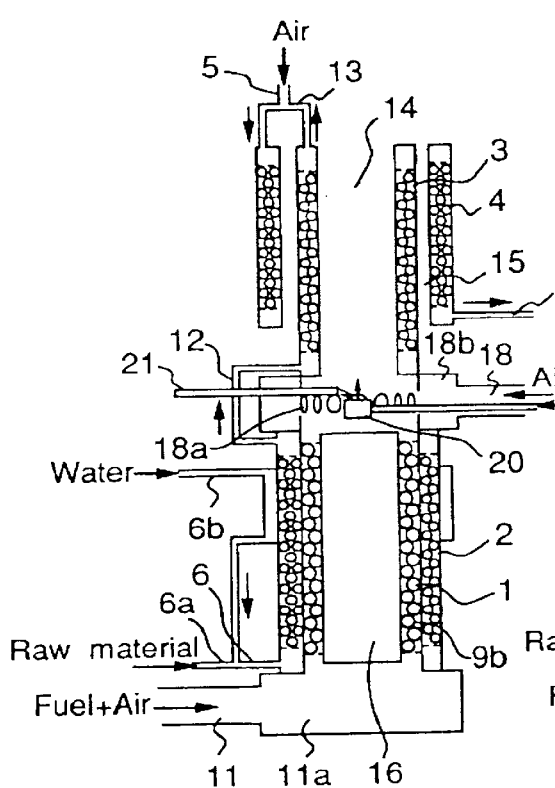
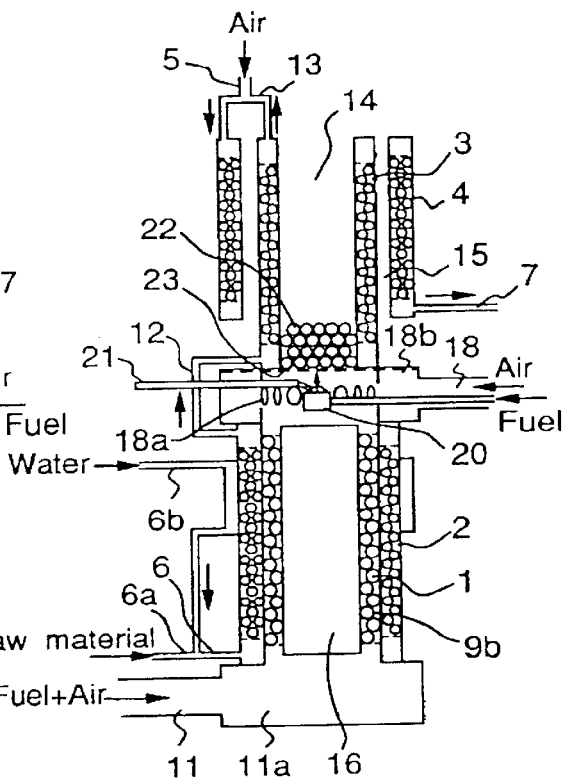

REFORMING APPARATUS FOR MAKING A CO-REDUCED REFORMED GAS

TECHNICAL FIELD

The present invention relates to a reforming apparatus which is used for preparing a reformed gas containing hydrogen as a principal component, by steam-reforming an alcohol such as methanol and the like, a hydrocarbon such as methane, butane and the like, or a fossil fuel such as naphtha, LNG and the like, as a raw material to be reformed. More particularly, the present invention relates to a reforming apparatus capable of decreasing the concentration of carbon monoxide contained in the resultant reformed gas after steam reformation, to a level of about several tens ppm.

BACKGROUND ART

Conventionally, a reforming apparatus, that performs steam reformation of a raw material to be reformed and produced a reformed gas containing hydrogen as a principal component, has been known. One of applications of the reformed gas is a fuel utilizable to generate electricity in a fuel cell but, in this case, since the carbon monoxide is poisonous to electrodes of the fuel cell, it is desired that the content of carbon monoxide (CO) in the reformed gas should be removed to a level of 100 ppm or less. Therefore, CO is removed from the reformed gas by employing, after the step of steam-reforming the raw material, a step of decreasing the concentration of CO in the resultant reformed gas by water-gas-shift reaction and a step of further decreasing the concentration of CO in the resultant reformed gas by selectively oxidizing CO, as disclosed in JPA HEI 5-251, 104. However, conventionally, since the three reaction steps mentioned above are performed separately in respective apparatuses, a reforming system as a whole tends to be bulky. In addition, since heat sources for providing heat of reaction are needed separately in respective reaction steps, heat loss is large. Therefore, in the conventional reforming apparatus, it has been desired to lower the heat loss and to reduce the size.

On the other hand, a prior art reforming apparatus designed to reduce the size thereof is disclosed in JPA HEI 7-126,001. Referring to this reforming apparatus, the reforming apparatus includes a reformation treating layer having a reforming reaction unit or section, a shift reaction unit and a CO oxidation unit, all arranged in series with each other along the direction of flow of gas, and a combustion gas flow path layer through which combustion gas coming from a combustion part passes, and has a structure in which the reformation treating layer and the flow path layer are alternatively positioned side by side above the combustion part. Thus, since the above three reaction units in this reforming apparatus are provided with heat from the combustion gas flow path layer, the reforming apparatus can make good use of heat in the combustion part. Also, since the reforming apparatus has the three reaction units built in one apparatus, downscaling is easy to accomplish.

However, the prior art reforming apparatus involves a problem that the temperature in each of the reaction units can not be suitably controlled. That is, it is known that catalytic reactions takes place in all of the above three reaction units and that there is a range of reactive temperature required in each of the reactions that take place respectively in the three reaction units. The range of reactive temperature of steam reforming reaction, which varies according to the kind of the raw material, for example, is about 400 to 1000° C., preferably, 600 to 900° C., when the raw material is a hydrocarbon such as butane, and also 250 to 400° C. when the raw material is methanol. On the other hand, the range of reactive temperature required by the water-gas-shift reaction or the CO selective oxidation reaction does not vary so much according to the kind of the raw material, and the range of reaction temperature required by the water-gas-shift reaction is generally about 200 to 350° C. and, preferably, 220 to 300° C., and that required by the CO selective oxidation reaction is generally about 100 to 250° C., preferably, 120 to 180° C. In general, the range of reactive temperature decreases in the order of that in the reforming reaction unit, that in the shift reaction unit, that in the CO oxidation unit. Therefore, it is necessary to control the temperature in each reaction unit so as to be in the above respective range of reactive temperature. However, the reforming reaction unit and the shift reaction unit in the above prior art reforming apparatus do not separate from each other, but continued unitarily, that is, they are functionally distinguished in that the form of reaction changes from the steam reforming reaction onto the water-gas-shift reaction as the temperature of the reformed gas lowers. For this reason, even though this reforming apparatus is capable of effectively performing the steam reformation of methanol which requires a small difference between the reforming temperature and the shift reaction temperature, the steam reformation of hydrocarbons tends to exhibit a temperature diverting from the required temperature range during a transit from the reforming unit to the shift reaction unit and, therefore, a problem would arise with the hydrocarbon such as butane of which reactive temperature range during the steam reforming reaction is high. Also, since the prior art reforming apparatus has a laminated structure that the reformation treating layers and the combustion gas flow path layers alternate sidewise, the same reaction units tend to have a varying temperature depending on the position in the laminated structure, and specifically, a temperature difference between a position near to the outer periphery of the apparatus and a center position of the apparatus tends to be considerably large because the position near to the outer periphery of the apparatus is cooled by the air outside. Particularly, this varying temperature becomes problematic in the CO oxidation unit which has a narrow range of reactive temperature. Thus, when it occurs that some of the reaction units have a temperature diverting from the required temperature range, there is a fear that the hydrogen content in the resultant reformed gas lowers and the CO concentration would not be sufficiently lowered.

DISCLOSURE OF THE INVENTION

The present invention is capable of solving the problem inherent in the foregoing reforming apparatus according to prior art and has for its object to provide a reforming apparatus which can be downscaled by integrating the reforming reaction unit, the shift reaction unit and the CO oxidation unit together, which can make good use of heat from the heat source, and in which the temperature of each reaction unit can be favorably controlled.

A reforming apparatus according to the present invention comprises an integrated structure of three separated units including a raw material reforming unit including a heat source, that generates heat by combustion of a fuel gas, and operable to steam-reform a raw material to be reformed by directly obtaining heat for the steam reforming reaction from the heat source to produce a reformed gas containing hydrogen as a main component; a shift reaction unit for decreasing CO contained in the reformed gas, that was produced in the raw material reforming unit, by water-gas-shift reaction; and a CO oxidation unit for further degreasing CO contained in the resultant reformed gas, that was treated in the shift reaction unit, by oxidation. The raw material reforming unit, the shift reaction unit and the CO oxidation unit are arranged so that the shift reaction unit and the CO oxidation unit can be indirectly heated by heat transfer from the heat source in the raw material reforming unit.

Since this reforming apparatus includes the above three reaction units integrated together, that is, the raw material reforming unit, the shift reaction unit and the CO oxidation unit, a reformed gas removed CO can be obtained in this solo apparatus. Therefore, it is not necessary to specially provide a process for removing CO and, hence, it is capable of downscaling the system as a whole. Also, since these reaction units are independent from each other and, moreover, the steam reforming reaction requiring the highest temperature range is performed under the condition heated directly by the heat source in the raw material reforming unit, whereas, the shift reaction unit and the CO oxidation unit, that require a lower temperature range than that in the raw material reforming unit, are arranged so as to be heated indirectly, that is, by heat transfer from the heat source, each reaction unit can be controlled corresponding to the required reaction temperature range.

In the present invention, it is preferable that the raw material reforming unit, the shift reaction unit and the CO oxidation unit are concentrically arranged relative to each other with at least the CO oxidation unit placed on an outer peripheral side of the reforming apparatus. That is, the concentrical arrangement of the raw material reforming unit, the shift reaction unit and the CO oxidation unit makes it difficult to occur a bias in amount of heat transfer from the heat source and also that in amount of heat dissipation to the outside within the same reaction unit in the shift reaction unit and the CO oxidation unit. Therefore, a partial temperature distribution in the shift reaction unit and the CO oxidation unit respectively can be minimized to allow the temperature control of the shift reaction unit and the CO oxidation unit to accomplish to the required range of reactive temperature. In addition, since of the three reaction units at least the CO oxidation unit requires the temperature thereof to be controlled to the lowest range of temperature is arranged on the outer peripheral side of the reforming apparatus, heat can be easily dissipated from the CO oxidation unit, and as the result, the temperature of the CO oxidation unit can be easily controlled to the low temperature range. Also, it is easy to downscale the reforming apparatus as a whole owing to concentric arrangement.

In the present invention, where the raw material reforming unit includes a generally cylindrical combustion chamber as the heat source and a reforming reaction unit for steam-reforming the raw material to produce the reformed gas, containing hydrogen as a principal component, the reforming reaction unit may be concentrically arranged relative to the combustion chamber so as to be directly heated, and the shift reaction unit and the CO oxidation unit may be concentrically arranged relative to the combustion chamber so as to be indirectly heated. Here, the generally cylindrical shape of the combustion chamber, which is not limited to the circular cylinder, is to be understood as including a polygonally-united tubular body. Also, a combustion means for burning a fuel in the combustion chamber may not be limited to specific one, but may include a burner and/or a combustion catalyst.

The reforming apparatus includes two modes relating to arrangement relation between the combustion chamber and the reforming reaction unit. One is a case where the reforming reaction unit is accommodated in the combustion chamber (FIGS. 23 to 27), another is a case where the reforming reaction unit is arranged around the combustion chamber in contact therewith (FIGS. 1 to 22). These two cases differ in the following point. In the former case, the reforming apparatus is just only heated from around thereof without heat dissipation from a surface thereof. While in the latter case, there is heat dissipation from around the reforming reaction unit.

Preferably an incombustible core is arranged at a center of the combustion chamber (FIGS. 9, 11, 14 to 17, 21, 22 and 24 to 26). That is, a flow space along which a combustion gas flows in the combustion chamber is narrowed by the core to increase a flow velocity of the combustion gas to thereby increase the efficiency of heat exchange with the reforming reaction unit. Preferably the core has a low heat capacity so that temperature rise of combustion chamber will not be hampered, and a hollow body is illustrated as an example of the core.

In the present invention, a method for indirectly heating the shift reaction unit and the CO oxidation unit includes: (1) a method of using heat conduction in solid or radiant heat conducted from the outer periphery of the combustion chamber through an intervening medium (FIGS. 1 to 7, and 27) and (2) a method of using heat of a burned exhaust gas flowing from the combustion chamber (FIGS. 8 to 27).

The reforming apparatus in which the shift reaction unit and the CO oxidation unit are indirectly heated by the method (1), may comprise the reforming reaction unit arranged around the combustion chamber in contact with an outer periphery of the combustion chamber and both of the shift reaction unit and the CO oxidation unit arranged around the reforming reaction unit.

In this reforming apparatus, the reforming reaction unit forms the intervening medium, and heat from the combustion chamber is transmitted to the shift reaction unit and the CO oxidation unit after having been decreased through the reforming reaction unit. Particularly, since the steam reformation performed at the reforming reaction unit is an endothermic reaction, heat from the combustion chamber decreases as a result of being consumed in the reforming reaction unit and thereafter conducts to the shift reaction unit and the CO oxidation unit. Also in this structure, since the reforming reaction unit, the shift reaction unit and the CO oxidation unit are arranged around the combustion chamber occupying the center of the reforming apparatus, it is effective for decreasing the height of the apparatus.

In addition, it is preferable that a partition wall having a function of regulating heat transfer is interposed between the reforming reaction unit and both of the shift reaction unit and the CO oxidation unit. Here, the above partition wall having a function of regulating heat transfer is intend to encompass any partition wall capable of regulating the temperature of heat to be transmitted down to the temperature range required by the shift reaction unit and the CO oxidation unit by decreasing the amount of heat transfer from the reforming reaction unit so that a residual heat of an unduly high temperature in the reforming reaction unit may be not transmitted directly to the shift reaction unit and the CO oxidation unit positioned outside thereof. This partition wall may comprise heat insulating materials, air layer or the like, and an optimum function of regulating heat transfer in the partition wall can be obtained by suitably selecting the kind of the material and thickness thereof. In this reforming apparatus, since the amount of heat transfer from the reforming reaction unit can be regulated by the partition wall, it is easy to control the temperature of the shift reaction unit and the CO oxidation unit.

In addition, a flow path connecting between the reforming reaction unit and the shift reaction unit may detour outside both of the shift reaction unit and the CO oxidation unit A reformed gas, immediately after emerging outwardly from the reforming reaction unit, is usually higher in temperature than the required temperature in the shift reaction unit, but the reformed gas can dissipate heat if the flow path connecting between the reforming reaction unit and the shift reaction unit detours outside of the shift reaction unit and the CO oxidation unit and, therefore, the reformed gas can be controlled to a suitable range of temperature.

In addition, it is preferable that the shift reaction unit is arranged on a side adjacent a high temperature zone of the reforming reaction unit and the CO oxidation unit is arranged on a side adjacent a low temperature zone of the reforming reaction unit, so as to be in conformity to a temperature distribution within the reforming reaction unit (see FIG. 2).

In the present invention, the reforming apparatus, in which the shift reaction unit and the CO oxidation unit are indirectly heated by the method (2), may comprise an exhaust chamber in which a burned exhaust gas from the combustion chamber directly flows, which the exhaust camber is positioned adjacent to and coaxially above the combustion chamber with the shift reaction unit arranged around the exhaust chamber and with the CO oxidation unit arranged around the shift reaction unit (see FIGS. 8 to 26).

In this reforming apparatus, the exhaust chamber is heated by a burned exhaust gas, the shift reaction unit is heated by heat transferred from around the exhaust chamber, and the CO oxidation unit is heated by heat transferred from the shift reaction unit. Since at this time, the temperature of the burned exhaust gas becomes lower than that of the combustion chamber, the shift reaction unit can be heated to lower temperature than that of the reforming reaction unit, and the CO oxidation unit placed outermost of the apparatus can be heated to lower temperature than that of the shift reaction unit. Therefore, the temperature of each reaction unit can be controlled to that required by respective reaction unit.

In this case, it is preferable to form a first air intake for introducing the fresh air in between the combustion chamber and the exhaust chamber (FIG. 12). Since the reformed gas immediately after having engaged outwardly from the combustion chamber, has a temperature as high as the combustion chamber, but the temperature of the shift reaction unit can be controlled by suitably cooling the burned exhaust gas with the fresh air from the air intake to reduce the temperature of the exhaust gas before the latter is fed to the exhaust chamber.

Additionally, in this case, it is referable to employ a secondary heating means for heating the exhaust chamber (FIGS. 16 and 17). The secondary heating means can be used for heating the exhaust chamber when the temperature to which the shift reaction unit is heated is low, and also for preheating the shift reaction unit at an early stage of preparation of the reformed gas.

Also, the reforming apparatus may be a construction that includes an exhaust vent for discharging the burned exhaust gas in the exhaust chamber to the outside, a shutter means for selectively opening and closing the exhaust vent, a first duct which is separated from the exhaust chamber and interposed between the shift reaction unit and the CO oxidation unit, and a second duct which is fluid-connected with the first duct and arranged around the CO oxidation unit (FIG. 21). In this reforming apparatus, a burned exhaust gas in the exhaust chamber flows to the first duct when the shutter means closes the exhaust vent and further flows to the second duct. At this time, the shift reaction unit and the CO oxidation unit are also heated by the burned exhaust gas then flowing through the first and second duct. On the other hand, when the exhaust vent is opened, the burned exhaust gas in the combustion chamber flows from the exhaust vent to outside and will not flow to the first and second duct. Therefore, the temperature of each of the shift reaction unit and the CO oxidation unit can be freely controlled by selectively opening or dosing the exhaust vent with the shutter means.

It is preferable to employ an air intake for introducing the fresh air into the second duct (FIG. 22). The use of this air intake makes it possible to cool only the burned exhaust gas then flowing through the second duct with the fresh air introduced into the second duct when the exhaust vent is closed by the shutter means, and therefore the CO oxidation unit can be more preferably controlled as to its temperature.

Also, it is preferable to employ an incombustible core in the center of the exhaust chamber (FIGS. 10, 11, 14 and 15). In this case, an effect similar to that brought about by the aforementioned core employed in the combustion chamber can be obtained at the exhaust chamber.

In the reforming apparatus according to the present invention, it is preferable that at least one of the reforming reaction unit, the shift reaction unit and the CO oxidation unit is provided on a surface thereof with a heat transfer material having a higher heat conductivity than that of a material forming the surface (FIG. 15). Each reaction unit has a tendency to develop a varying temperature along the direction of flow of the gas. For example, the reforming reaction unit has a tendency to exhibit a temperature drop on a leeward side thereof because of the endothermic reaction taking place therein, and the shift reaction unit and the CO oxidation unit have a tendency to exhibit a temperature rise on the respective leeward side thereof because of the exothermic reaction taking place therein. The heat transfer material provided on the surface of the reaction unit performs a role to level off the above difference in temperature.

Also, in the reforming apparatus according to the present invention, the CO oxidation unit may have an outer surface thereof provided with a fin for heat dissipation (FIGS. 19 and 20). In the event that the amount of heat transfer conducted from the heat source to the CO oxidation unit is excessive, heat can be dissipate from the fin to control the temperature of the CO oxidation unit so as to fall within the range of reactive temperature required by the CO oxidation unit.

Alternatively, the reforming apparatus in which the shift reaction unit and the CO oxidation unit are indirectly heated by the method (2), may have a construction that includes a main exhaust chamber in which a burned exhaust gas from the combustion chamber directly flows, a main exhaust vent for directly discharging the burned exhaust gas in the main exhaust chamber to the outside, a shutter means for selectively opening and closing the main exhaust vent, a first duct which is separated from the main exhaust chamber and fluid-connected thereto and is arranged around the main exhaust chamber, and a second duct which is fluid-connected with the first duct and arranged around the first duct, wherein the shift reaction unit is placed in the first duct and the CO oxidation unit is placed in the second duct (FIGS. 23 to 26).

In this reforming apparatus, when the main exhaust vent is closed by the shutter means, the burned exhaust gas from the combustion chamber flows through the first duct and then through the second duct, and the shift reaction unit placed in the first duct and the CO oxidation unit placed in the second duct are heated by the above burned exhaust gas. On the other hand, when the main exhaust vent is opened, the burned exhaust gas from the combustion chamber is discharged mainly from the main exhaust vent through the main exhaust chamber and will not flow to the first and second duct. At this time, the shift reaction unit and the CO reaction unit are heated by heat conduction in solid and radiant heat conducted from the main exhaust chamber, and also heat of burned exhaust gas flowing inside thereof. Thus, during an early running of this reforming apparatus before preparation of the reformed gas, not only the reforming reaction unit but also the shift reaction unit and the CO oxidation unit can be preheated by previously burning in the combustion chamber while the main exhaust vent is dosed by the shutter means. During a steady running of this reforming apparatus, each reaction unit can be more preferably controlled as to its temperature by keeping the main exhaust vent in an opened position.

This reforming apparatus can include an exhaust sub-vent for discharging a burned exhaust gas within the first duct to the outside, and a shutter means for selectively opening and closing the exhaust sub-vent (FIGS. 21 to 26). In this case, when the exhaust sub-vent is kept open while the main exhaust vent is opened, a burned exhaust gas slightly flows to the first duct from a separating portion between the main exhaust chamber and the first duct, and then discharged from the exhaust sub-vent. The burned exhaust gas slightly flowing through the first duct works to heat the shift reaction unit to a somewhat higher temperature range than that in the CO oxidation unit. Therefore, each reaction unit can be more preferably controlled as to its temperature.

In addition, it is preferable that at least one of the shift reaction unit and the CO oxidation unit is formed into a coil-like shape (FIGS. 23 to 26). In this case, because the shift reaction unit and the CO oxidation unit is formed into a coil-like shape, efficiency of heat exchange becomes good when the shift reaction unit and the CO oxidation are heated by a burned exhaust gas.

Also, it is preferable to form an air feed channel for introducing the fresh air into the second duct (FIGS. 23 to 26). In this case, the CO oxidation unit can be temperature-controlled by the fresh air introduced from the air feed channel into the second duct into.

In the reforming apparatus according to the present invention, it is preferable that at least a portion of a raw material feed channel for feeding the raw material and steam to the raw material reforming unit is arranged in a position in which the raw material and the steam are preheated by heat from the heat source of the raw material reforming unit (FIGS. 3 to 27).

That is, while the raw material reforming unit is fed with the raw material and steam which are in a state of mixture through the raw material feed channel, the capability of the raw material feed channel being preheated facilitates generation of steam from water in the raw material feed channel and, therefore, water rather than steam can be supplied from a source of the raw material to the raw material feed channel. This dispenses with necessity of use of a separate steam generating apparatus and, consequently, a reforming system can be downscaled as a whole. Also, since the preheating of the raw material feed channel allows the raw material and steam to be heated to a temperature close to the temperature range required for the steam reformation, the reformation reaction in the raw material reforming unit can be immediately initiated in an early state of the raw material reforming unit without the temperature of a reformation catalyst therein being lowered.

Though the method for preheating the raw material feed channel is not limited to specified one, another preheating method may be employed in which, for example, at least a portion of the raw material feed channel is held in contact with the surface of at least one of the reforming reaction unit, the shift reaction unit and the CO oxidation unit (FIGS. 3 to 6, 8 to 24, and 26); at least a portion of the raw material feed channel is arranged at a position contactable with the burned exhaust gas from the heat source of the raw material reforming unit (FIG. 7); or at least a portion of the raw material feed channel is arranged at such a position that it can be directly heated by the heat source of the raw material reforming unit (FIGS. 25 and 27).

Also, in the reforming apparatus according to the present invention, where the heat source of the raw material reforming unit generates heat by catalytic combustion, it is preferable to employ a preheating means for preheating the combustion catalyst held in the heat source (FIG. 18). In the case of the heat source generating heat by catalytic combustion, the combustion do not start until when temperature of the combustion catalyst rises up to some degree but, the combustion reaction can start immediately in early time of beginning combustion if the combustion catalyst is preheated by the preheating means in advance.

The reforming apparatus according to the present invention is particularly effective where the raw material to be reformed is employed of a kind which the reactive temperature of reformation reaction thereof is in a high temperature range. For example, in the case of butane used as the raw material, it is necessary that the reforming reaction unit is heated to the range of 400 to 1000° C.; the shift reaction unit is heated to the range of 200 to 350° C.; and the CO oxidation unit is heated to the range of 100 to 250° C. When the reactive temperature of the reforming reaction unit is in the high temperature range like this case, a difference between reactive temperature required in the reforming reaction unit and that required in the shift reaction unit and the CO oxidation unit becomes so large that the temperature control thereof becomes difficult to accomplish. However, in the reforming apparatus according to the present invention, as above mentioned, since the three reaction unit is independent from each other and not only is the reforming reaction unit directly heated from the combustion unit, but the shift reaction unit and the CO oxidation unit are indirectly heated by heat transfer from the combustion unit, the temperature of the reforming reaction unit can be easily controlled to the high temperature range, and that of the shift reaction unit and the CO oxidation unit can also be easily controlled to the low temperature range.

BRIEF DESCRIPTION OF THE DRAWINGS

FIG. 8 is a schematic unital view showing the reforming apparatus according to Embodiment 8 of the present invention;

FIG. 9 is a schematic unital view showing the reforming apparatus according to Embodiment 9 of the present invention;

FIG. 14 is a schematic unital view showing the reforming apparatus according to Embodiment 13 of the present invention;

FIG. 15 is a schematic unital view showing the reforming apparatus according to Embodiment 14 of the present invention;

FIG. 16 is a schematic unital view showing the reforming apparatus according to Embodiment 15 of the present invention;

FIG. 17 is a schematic unital view showing the reforming apparatus according to Embodiment 16 of the present invention;

BEST MODE FOR CARRYING OUT THE INVENTION

Hereinafter, the reforming apparatus according to the present invention will be described. In the following description, the reforming apparatus is assumed to be held upright with top and bottom thereof corresponding to top and bottom of each figure of the accompanying drawings.

Embodiment 1

The reforming apparatus according to a first preferred embodiment of the present invention will first be described. The first embodiment of the present invention provides a basic structure of the reforming apparatus while a group of the first to seven embodiments of the present invention make use of component parts of the reforming apparatus that are similar to those employed in the basic structure according to the first embodiment of the present invention.

Figure 1:
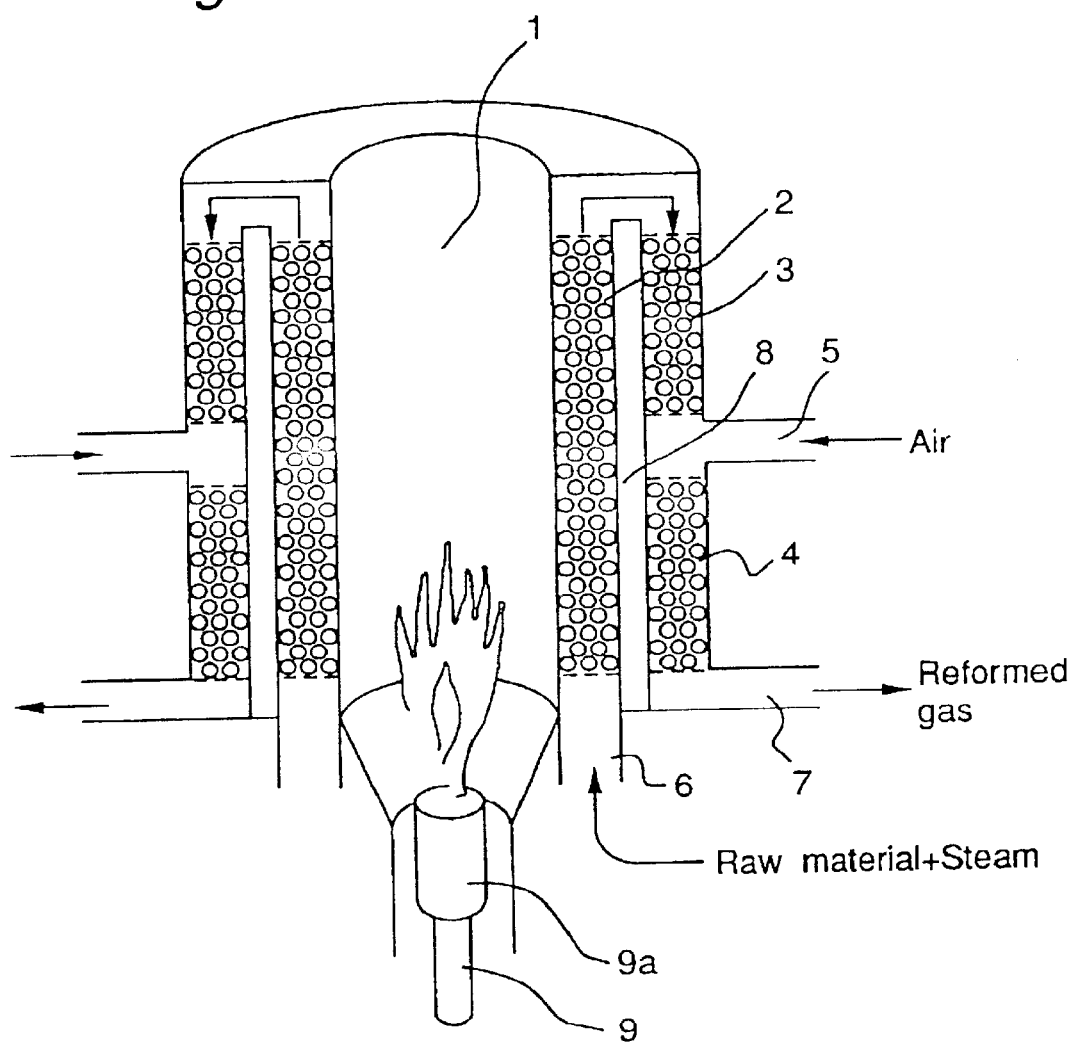
FIG. 1 is a schematic unital view showing a reforming apparatus according to Embodiment 1 of the present invention.

The reforming apparatus according to the first embodiment comprises, as shown in FIG. 1, a generally cylindrical combustion chamber 1 which serves as a heat source, surrounded by a reforming reaction unit 2 for steam-reforming a raw material to generate a reformed gas containing hydrogen as a principal component. The reforming reaction unit 2 is in turn surrounded by a shift reaction unit 3 for reducing CO, contained in the reformed gas generated by the reforming reaction unit 2, by the water shift reaction and a CO oxidizing unit 4 for oxidizing the CO component, contained in the reformed gas after treatment in the shift reaction unit 3, to thereby further reduce the CO component. The reforming reaction unit 2, the shift reaction unit 3 and the CO oxidizing units 4 are separate units and arranged in coaxial relation to each other.

The combustion chamber 1 is of a generally cylindrical shape and is positioned centrally of the reforming apparatus- This combustion chamber 1 has a top end opening outwardly and a bottom end accommodating a burner 9a which serves as a combustion means 9. It is, however, to be noted that the combustion chamber 1 may not be limited to the cylindrical shape, but may have a polygonal cross-unit and that the combustion means 9 may comprise, other than the burner 9a, any suitable means such as, for example, a catalytic combustion means.

The reforming reaction unit 2 has an annular gas passage defined by an annular layer exterior around an outer periphery of the combustion chamber 1 and filled with a reforming catalyst and is adapted to be heated directly from the combustion chamber 1. Also, the reforming reaction unit 2 is provided with a raw material supply path 6 for supplying the reforming raw material and the steam. In the first embodiment of the present invention, the raw material supply path 6 is connected with a bottom end of the reforming reaction unit 2.

The reforming catalyst referred to above is of a kind effective to induce a so-called steam reforming reaction in which the reformed gas containing hydrogen as a principal component can be generated by causing the reforming raw material and the steam contact each other under the elevated temperatures, and may be employed in the form of a carrier made of, for example, alumina or zirconium, and deposited with metal such as, for example, Ni, Rh and/or Ru. The reforming reaction unit 2 is of a design in which a gaseous mixture of the reforming raw material and the steam can pass through interstices among particles of the reforming catalyst, at which time the gaseous mixture contacts the reforming catalyst particles to initiate the steam reforming reaction to generate the reformed gas rich of hydrogen. In addition to the hydrogen, this reformed gas contain carbon dioxide, carbon monoxide, methane and so on. This steam reforming reaction is an endothermic reaction and a direct heating by the effect of heats from the combustion chamber 1 therefore provides a reaction heat. By way of example, where a gas of a hydrocarbon system is employed for the reforming raw material, the steam reforming reaction occurs favorably generally if the reaction temperature is chosen to be of a value equal to or higher than 500° C. The reforming raw material referred to above may comprise a gas of a hydrocarbon system such as, for example, a gaseous methane, propane or butane, or alcohol, gasoline, kerosene or naphtha which exhibits a liquid phase at room temperatures. By way of example, where butane is employed for the gaseous raw material, the steam reforming reaction referred to above results in generation of the reformed gas in which about 70% of hydrogen, about 15% of carbon dioxide, about 10% of carbon monoxide and several percents of methane and others are mixed together. The heating temperature of this reforming reaction unit 2 can be controlled by suitably adjusting the size or the like of flames of the burner 9a.

The shift reaction unit 3 and the CO oxidizing unit 4 are positioned radially outwardly of the reforming reaction unit 2 with a partition wall 8 intervening therebetween. The shift reaction unit 3 is formed in a top aloof portion of a gas passage defined by an annular layer exteriorly around the reforming reaction unit 2, which top aloof portion is communicated with the reforming reaction unit 2 and filled with a shift catalyst. On the other hand, the CO oxidizing unit 4 is formed in a bottom lee portion of the gas passage spaced a distance downwardly from the shift reaction unit 3 and filled with a CO oxidizing catalyst. A connection between the shift reaction unit 3 and the CO oxidizing unit 4 is provided with an air supply passage 5 through which air can be supplied. In the first embodiment shown, the shift reacting unit 3 is arranged exteriorly around a top region of the reforming reaction unit 2 with its top communicated with the top of the reforming reaction unit 2, whereas the CO oxidizing unit 4 is arranged exteriorly around a bottom region of the reforming reaction unit 2 with its top fluid-connected with a bottom of the shift reaction unit 3. The CO oxidizing unit 4 has a bottom provided with a reformed gas discharge passage 7 through which the reformed gas with the CO component having been removed therefrom can be discharged.

The shift catalyst referred to above is used to reduce the CO content in the reformed gas, generated in the reforming reaction unit 2, by the water shift reaction and may be employed in the form of a carrier made of, for example, alumina or zirconium and deposited with, for example, Cu, Zn, Fe and/or Cr. In this shift reaction unit 3, the reformed gas generated in the reforming reaction unit 2 contacts the shift catalyst wherefore the shift reaction in which the carbon monoxide content in the reformed gas react with the steam to generate hydrogen and carbon dioxide takes place, and therefore, a major portion of the carbon monoxide contained in the reformed gas can reduced down to, for example, a density of about 1%. The shift reaction referred to above is an endothermic reaction that takes place at a temperature lower than the steam reforming reaction taking place in the reforming reaction unit 2. By way of example, where a hydrocarbon gas is employed as a raw material gas for the shift reaction, the reaction takes place at a reaction temperature of about 200 to 350° C. and preferably 220 to 300° C.

On the other hand, the CO oxidizing catalyst is used to selectively oxidize a CO content remaining in the reformed gas which has been treated in the shift reaction unit 3 and may be employed in the form of a carrier made of alumina or zirconium and deposited with, for example, Pt and/or Ru. In the CO oxidizing unit 4, the reformed gas from which the CO content has been reduced in the shift reaction unit 3 is, after having been mixed with the air (oxygen) supplied through the air supply passage 5, brought into contact with the CO oxidizing catalyst so that it can be selectively oxidized to generate carbon dioxide which is then removed. In this CO oxidizing unit 4, the density of the CO content in the reformed gas is further reduced down to, for example, about 100 ppm or lower. The oxidizing reaction brought about by the CO oxidizing catalyst with the carbon monoxide is an endothermic reaction which takes place at a reaction temperature lower than the shift reaction, for example, at a reaction temperature of about 100 to 250° C. and preferably about 120 to 180° C.

The partition wall 8 intervening between the reforming reaction unit 2 and both of the shift reaction unit 3 and the CO oxidizing unit 4 has a capability of self-adjusting thermal conduction, that is, a capability of transmitting a controlled quantity of heats from the reforming reaction unit 2 to the shift reaction unit 3 and the CO oxidizing unit 4, without allowing the after-heat from the reforming reaction unit 2 to remain excessively high before it is transmitted to the shift reaction unit 3 and the CO oxidizing unit 4, so that the shift reaction unit 3 and the CO oxidizing unit 4 can be heated to the respective reaction temperatures. The partition wall 5 having such a thermal conductivity self-adjusting capability may be in the form of, for example, any known adiabatic layer or a hollow layer and, by suitably adjusting the material and the thickness thereof, an optimum thermal conduction adjusting effect can be obtained.

Since the reforming apparatus comprises a coaxial arrangement of the combustion chamber 1, the reforming reaction unit 2 and both of the shift reaction unit 3 and the CO oxidizing unit 4 with the combustion chamber 1 inside the reforming reaction unit 2, the reforming system for providing the reformed gas with the CO content removed can be assembled compact. Also, since heat from the combustion chamber 1 is consumed by the reforming reaction unit 2 in which the steam reforming reaction which is the endothermic reaction under the elevated temperatures takes place, after-heat of which is transmitted indirectly to both of the shift reaction unit 2 and the CO oxidizing unit 4 and, since the heat from the combustion chamber 1 can thus be utilized effectively by the reforming reaction unit 2, the shift reaction unit 3 and the CO oxidizing unit 4, the loss of heat can be minimized advantageously. In particular, since the reforming reaction unit 2 and both of the shift reaction unit 3 and the CO oxidizing unit 4 are coaxial with each other, they can be arranged in equilibrium relatively to the combustion chamber 1, serving as the heat source, without being biased even slightly relative to the combustion chamber 1 and, consequently, any possible variation in temperature within the same reaction unit can advantageously minimized. In addition, heat conducted from the reforming reaction unit 2 is, after the temperature thereof has been adjusted by the partition wall 5 to the proper value, transmitted to the shift reaction unit 3 and the CO oxidizing unit 4 within which the respective reactions take place at a temperature lower than that in the reforming reaction unit 2 and, therefore, the respective reaction within the shift reaction unit 3 and the CO oxidizing unit 4 can take place at the properly controlled temperatures.

Embodiment 2

Figure 2:
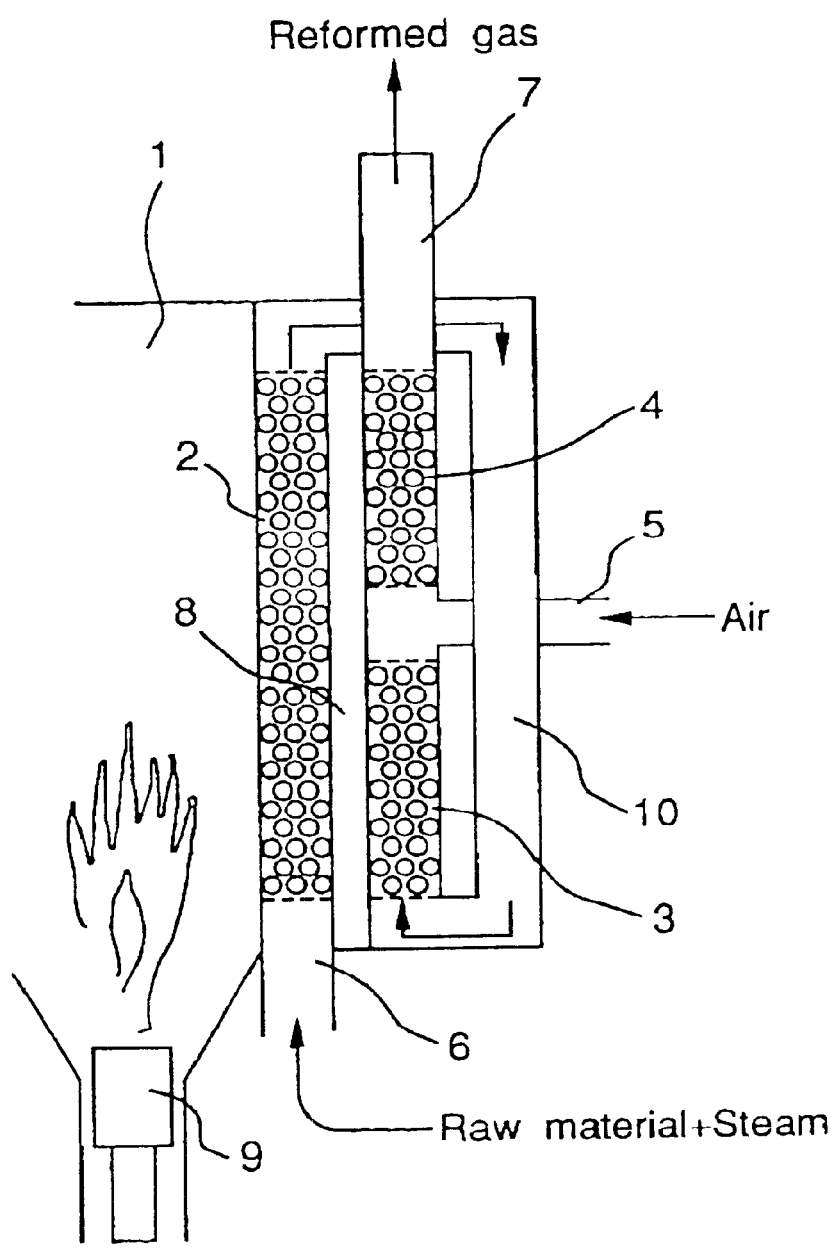
FIG. 2 is a schematic unital view showing a portion of the reforming apparatus according to Embodiment 2 of the present invention.

In the next step, a second preferred embodiment of the present invention will be described. This reforming apparatus is of a structure as shown in FIG. 2 wherein the reforming reaction unit 2 and the shift reaction unit 3 are connected by a flow path 10 detouring outside both of the shift reaction unit 3 and the CO oxidation unit 4, which is different part from the embodiment 1. In detail, the shift reaction unit 3 is positioned outside the lower part of the reforming reaction unit 2, while the CO reaction unit 4 is positioned outside the upper part of the reforming reaction unit 2. The upper end of the reforming reaction unit 2 and the lower end of the shift reaction unit 3 is connected by the detouring flow path 10, and a supply exit 7 of the reformed gas is provided at the upper end of the CO oxidation unit 4. Therefore, in the second embodiment the high temperature reformed gas from discharges heat in the detouring flow path 7, so that the temperature of the reformed gas comes down to a reaction temperature of the shift reaction unit 3. Then, the reformed gas is supplied to the shift reaction unit, by which a good shift reaction may go in the shift reaction unit 3.

The positioning of the shift reaction unit 3 and the CO reaction unit 4 outside the reforming reaction unit 2 makes the temperature distribution of the shift reaction unit 3 and the CO reaction unit 4 corresponded to that of the reforming reaction unit 2 That is, the lower side of the reforming reaction is a higher temperature zone because of nearer situation from a burner 9 in the combustion chamber 1 while the upper side is a lower temperature zone because of further situation from the burner 9. As explained above, the reaction temperature of the shift reaction unit 3 is higher than that of the CO reaction unit 4, so that the structure makes it easy to control the temperature of the shift reaction unit 3 and the CO reaction unit 4.

Embodiment 3

Figure 3:
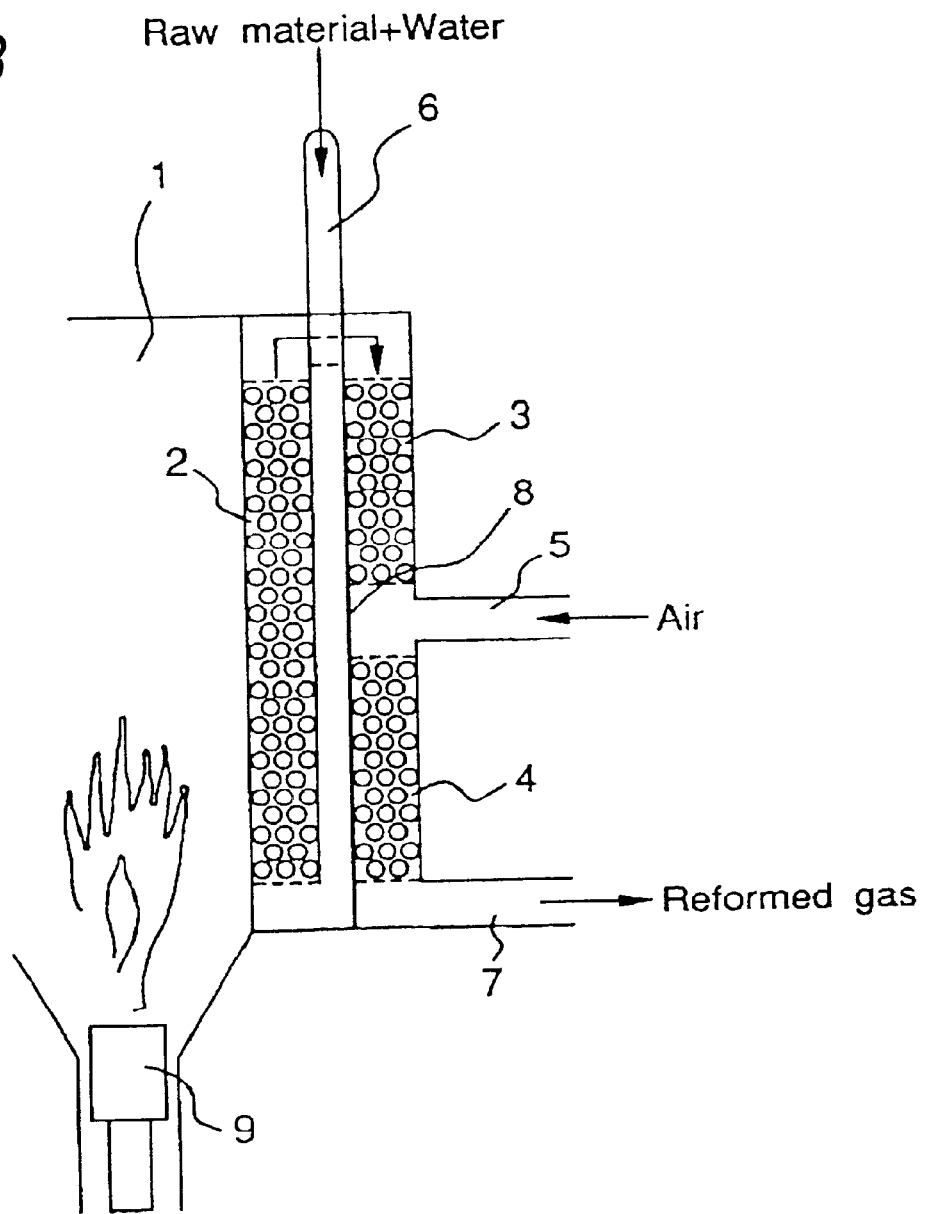
FIG. 3 is a schematic unital view showing a portion of the reforming apparatus according to Embodiment 3 of the present invention.

The reforming apparatus according to a third preferred embodiment will be described. This reforming apparatus is of a structure, as shown in FIG. 3, in which a raw material supply path 6 is running from the upper side to the lower side of a partition wall 8 interposed between the reforming reaction unit 2, the shift reaction unit 3 and the CO reaction unit 4, which is a different part from the embodiment 1. In this apparatus, mixture of raw materials and steam flowing through the supply path 6 is preheated by the reforming reaction unit 2 and then supplied to the reforming reaction unit 2, so that the mixture entering into the reforming reaction unit 2 is easy to be heated to a reaction temperature zone in a good controlled manner. In the raw material supply path 6, water supplied together with raw materials can be evaporated so that no steam generator is provided therein.

Embodiment 4

Figure 4:
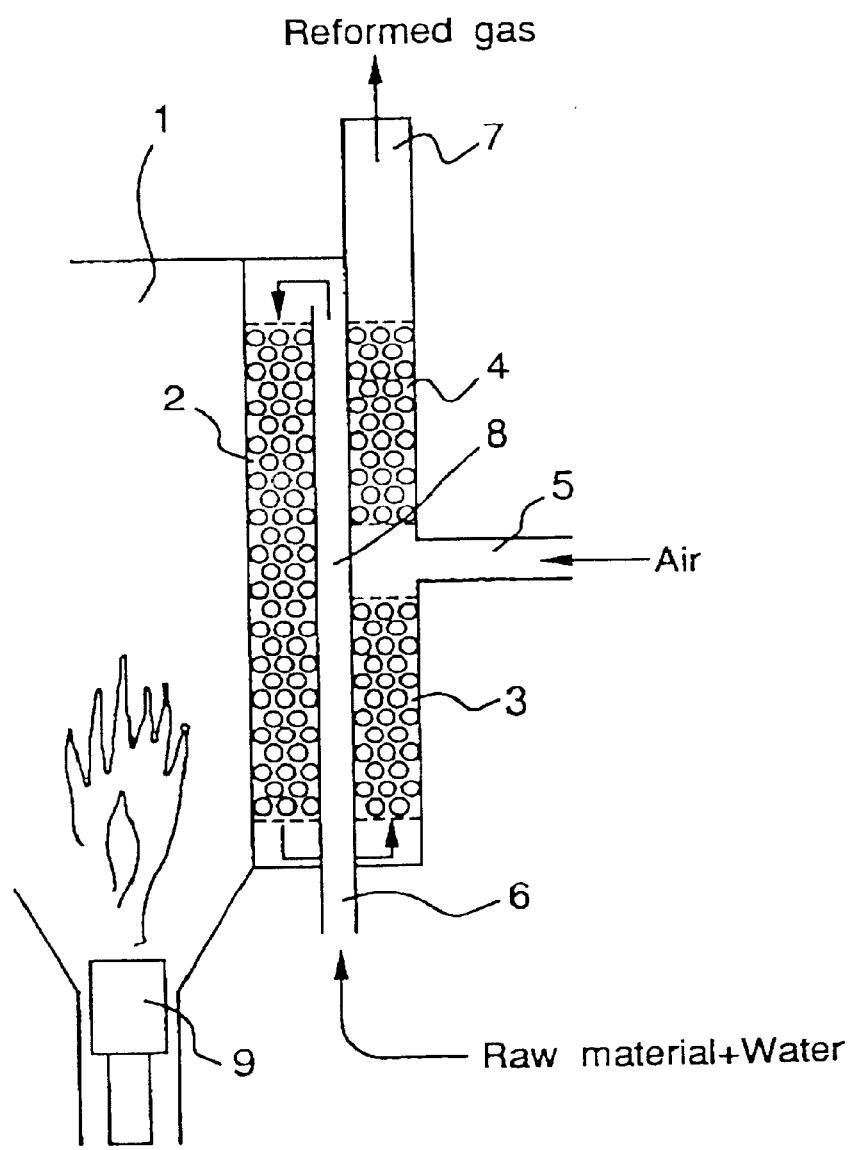
FIG. 4 is a schematic unital view showing a portion of the reforming apparatus according to Embodiment 4 of the present invention.

The reforming apparatus according to a third preferred embodiment will be described. This reforming apparatus is of a structure, as shown in FIG. 4, in which the reforming reaction unit 2, the shift reaction unit 3, the CO reaction unit 4 and the raw material supply path 6 are arranged in an upside-own manner of the third embodiment That is, the shift reaction unit 3 is arranged on an outer peripheral side of the lower part of the reforming reaction unit 2 while the CO reaction unit 4 is arranged on an outer peripheral side of the upper part of the reforming reaction unit 2. The raw material supply path 6 interposed in the partition wall 8 is running from the lower side thereof to the upper side thereof and connected to the upper end of the reforming reaction unit 2. Therefore, in the same manner as the third embodiment, the raw material supply path 6 can be preheated by heat of the reforming reaction unit 2. Further in the same manner as the second embodiment, the shift reaction unit 3 and the CO oxidation unit 4 are arranged in conformity to the temperature distribution of the reforming reaction unit 2. Accordingly, a better temperature control can be obtained in each of the units.

Embodiment 5

Figure 5:
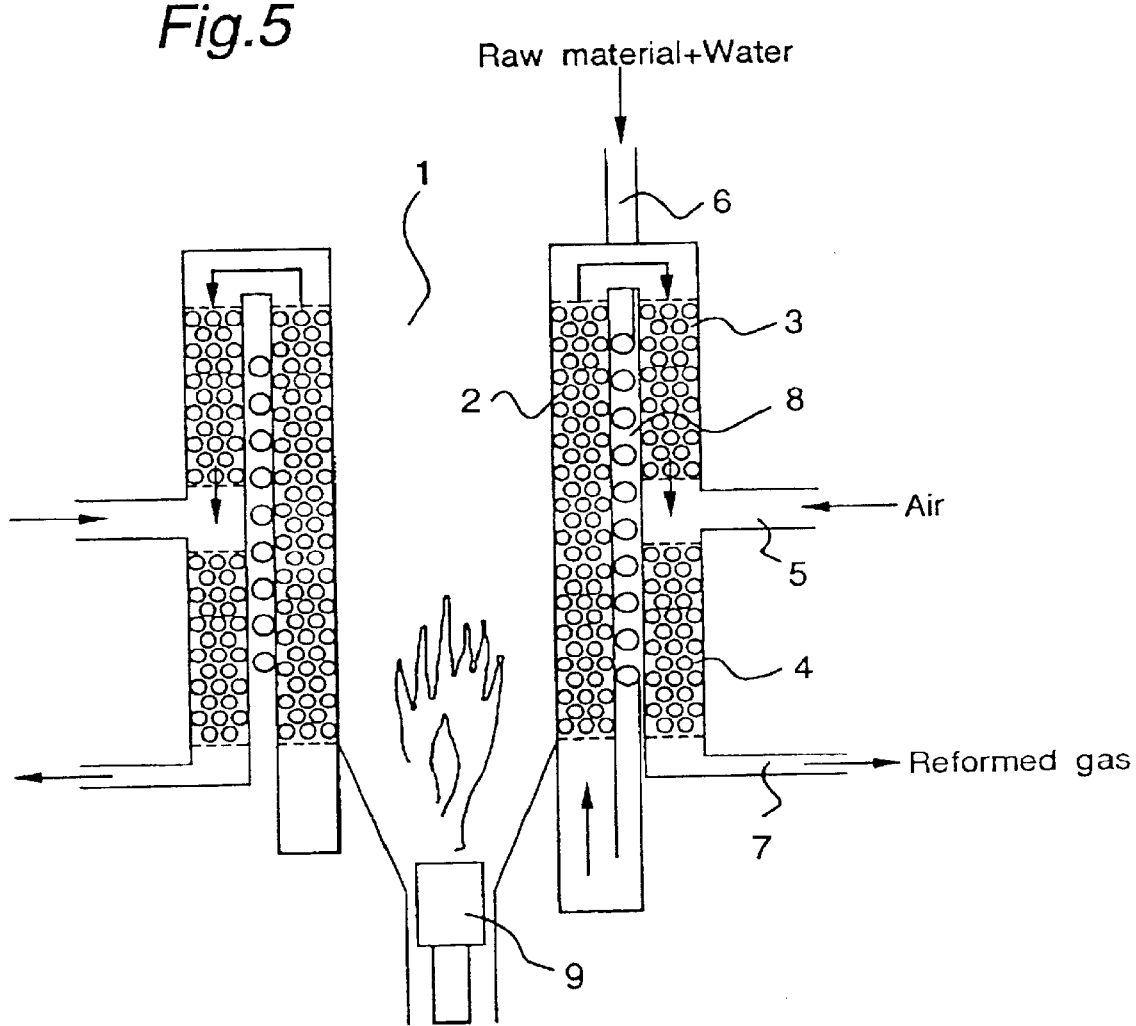
FIG. 5 is a schematic unital view showing the reforming apparatus according to Embodiment 5 of the present invention.
Figure 6:
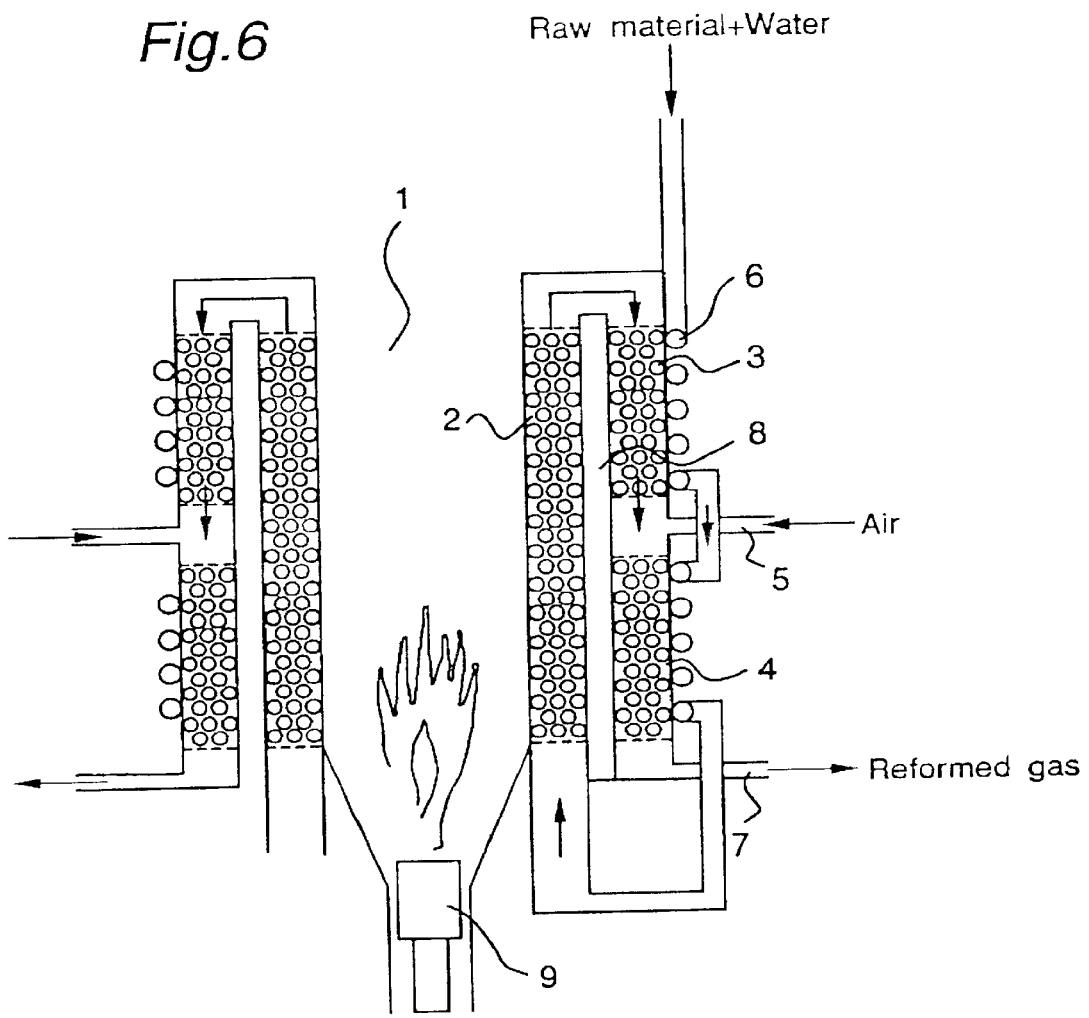
FIG. 6 is a schematic unital view showing the reforming apparatus according to Embodiment 6 of the present invention.

The reforming apparatus according to a fifth preferred embodiment will be described. This reforming apparatus is of a structure, as shown in FIG. 5, in which the raw material supply path 6 interposed in the partition wall in the third embodiment is attached in a coil pattern around the reforming reaction unit 2. The structure is sufficient to preheat the raw material supply path 6 and is a same function of regulating heat transfer as that of the partition wall 8. That is, the mixture of raw material and steam can absorb heat from the reforming reaction unit 2, by which the heat transfer to the shift reaction unit 3 and the CO oxidation unit 4 can be regulated.

Embodiment 6

The reforming apparatus according to a sixth preferred embodiment will be described. This reforming apparatus is of a structure,as shown in Fig,6, in which in the first embodiment the raw material supply path 6 is a coil pattern arranged around the outer side of the shift reaction unit 3 and the CO oxidation unit 4. The structure is sufficient to preheat the raw material supply path 6 by heat of the shift reaction unit 3 and the CO oxidation unit 4. Utilization of extra heat from the shift reaction unit 3 and the CO oxidation unit 4 for preheating the raw material supply path 6 realizes effective use of heat source and decreases heat loss.

Embodiment 7

Figure 7:
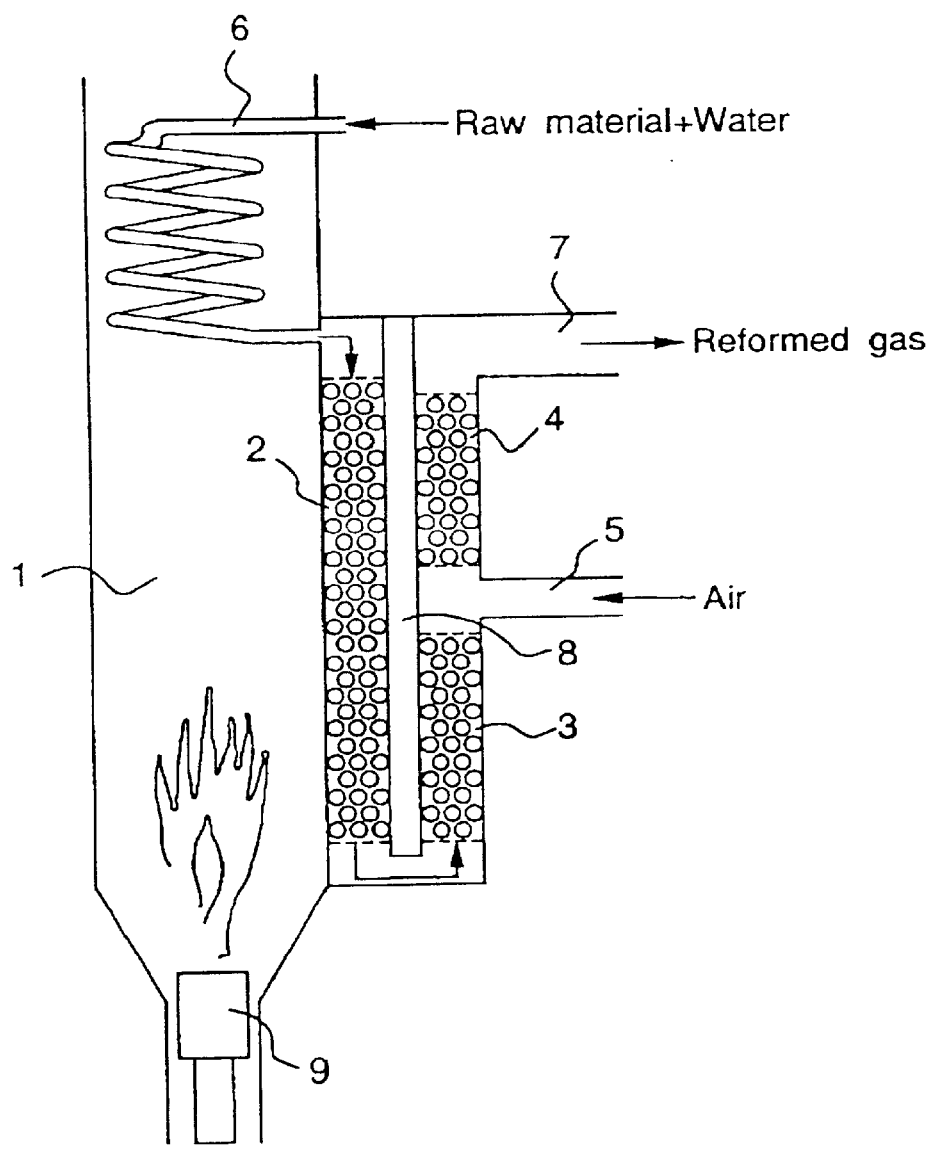
FIG. 7 is a schematic unital view showing a portion of the reforming apparatus according to Embodiment 7 of the present invention.

The reforming apparatus according to a sixth preferred embodiment will be described. This reforming apparatus is of a structure, as shown in FIG. 7, in which in the first embodiment, the reforming reaction unit 2, the shift reaction unit 3 and the CO oxidation unit 4 are arranged in an upside-own manner and an introduction part of the raw material supply path 6 is arranged in a coil pattern and positioned at the upper side of the combustion chamber 1 while an exit end of the raw material supply path 6 is connected to the upper side of the reforming reaction unit 2. The structure is sufficient to preheat the raw material supply path 6 by the exhaust gas heat of the combustion chamber 1, so that utilization of extra heat from the combustion chamber for preheating the raw material supply path 6 realizes effective use of heat source and decreases heat loss.

Embodiment 8

The reforming apparatus according to an eighth preferred embodiment of the present invention will be described. The eighth embodiment of the present invention provides a basic structure of the reforming apparatus while a group of eighth to twentieth embodiments of the present invention make use of component parts of the reforming apparatus that are similar to those employed in the basic structure according to the eighth embodiment of the present invention.

The reforming apparatus according to the eighth embodiment comprises, as shown in FIG. 8, a generally cylindrical combustion chamber 1 arranged with its longitudinal axis oriented vertically, and a reforming reaction unit 2 in the form of a coil surrounding around and in contact with the combustion chamber 1. The combustion chamber 1 has an upper portion formed with an exhaust chamber 14 coaxial with the combustion chamber 1 for allowing a combustion exhaust gas to flow upwardly therethrough from the combustion chamber 1. A shift reaction unit 3 is disposed so as to surround around the exhaust chamber 14, and a CO oxidizing unit 4 is disposed radially outwardly of the shift reaction unit 3 with an airspace 15 defined between it and the shift reaction unit 3

The reforming reaction unit 2 has a lower end fluid-connected with a raw material supply path 6. This raw material supply path 6 includes a raw material pipe 6a for the supply of only a reforming raw material therethrough and a steam pipe 6b for the supply of a steam (water) therethrough, both of said pipes 6a and 6b being joined together on their length. The steam pipe 6b has a portion disposed having been coiled around and in contact with the outer periphery of the reforming reaction unit 2 so that it can be preheated by heat evolved from the reforming reaction unit 2.

The reforming reaction unit 2 has an upper end fluid-connected with a lower end of the shift reaction unit 3 through a connection tube 12 The shift reaction unit 3 has an upper end fluid-connected with an upper end of the CO oxidizing unit 4 through a connection tube 13. This connection tube 13 is provided with an air supply passage 5 for the introduction of air necessitated by and in the CO oxidizing unit 4.

The combustion chamber 1 is filled therein with a combustion catalyst 9b as a combustion means 9. The combustion catalyst 9b may be employed in the form of a carrier deposited with, for example, Pt, Ru, Pd and/or Rh. The combustion chamber 1 has a lower end fluid-connected with a fuel supply passage 11 for the supply of a fuel and a combustion chamber of ruse in combustion. This fuel supply passage 11 has a hole 11 a defined at a location adjacent an entrance to the combustion chamber 1 so that the gaseous fuel can be supplied uniformly into the combustion chamber 1. It is to be noted that in the combustion chamber 1 a burner may be employed as the combustion means 9.

The operation of the reforming apparatus will now be described. The gaseous fuel and the air are supplied from the fuel supply passage 11 into the combustion chamber 1 and are burned in contact with the combustion catalyst 9b to emit heat. An exhaust gas produced as a result of combustion in the combustion chamber 1 is discharged to the outside through the exhaust chamber 14. On the other hand, a mixture of a reforming material and a steam is supplied from the raw material supply path 6 into the reforming reaction unit 2. Although the liquid phase is supplied into the steam pipe 6b, this liquid phase is preheated by heat evolved from the reforming reaction unit 2 to transform into a steam which is subsequently mixed with the reforming raw material. The reforming raw material is transformed in the reforming reaction unit 2 into a reformed gas containing CO and, as the reformed gas flow successively through the shift reaction unit 3 and the CO oxidizing unit 4, the CO component is removed to provide a reformed gas that is subsequently delivered outwardly from the reformed gas discharge passage 7. At this time, the reforming reaction unit 2 is directly heated from the combustion chamber 1 and is then controlled to attain the maximum possible temperature whereas the shift reaction unit 3 is heated from the exhaust chamber. 14, in which the combustion exhaust gas flows, and is controlled to a temperature lower than that of the reforming reaction unit 2 and, on the other hand, the CO oxidizing unit 4 is heated by a heat conduction from the shift reaction unit 3 and is controlled to a temperature lower than that of the shift reaction unit . In this way, the reforming reaction unit 2 is directly heated and both of the shift reaction unit 3 and the CO oxidizing unit 4 are heated indirectly, wherefore a favorable temperature control is possible and, since these reaction units are coaxially arranged with respect to each other, a temperature variation is minimized. It is to be noted that the control of the temperature of the CO oxidizing unit 4 can be facilitated if a cooling air is applied by, for example, a fan disposed externally.

Embodiment 9

In the next step, a ninth preferred embodiment of the present invention will be described. This reforming apparatus is of a structure as shown in FIG. 9 wherein in the eighth embodiment an inflammable core 16 is disposed centrally within the combustion chamber 1. This core 16 has a hollow and has a small heat capacity. Because of the presence of the core 16, a gas flow passage inside the combustion chamber 1 is constricted to allow the flow to be accelerated, wherefore the efficiency of heat exchange between the reforming reaction unit 2 and the combustion gas can be increased. Also, since the reforming reaction unit 2 is heated mainly by the combustion gas flowing around and in the vicinity of the combustion chamber 1 and the combustion gas flowing centrally within the combustion chamber 1 does not participate so much in heating the reforming reaction unit 2 and has a high possibility of being discharged outwardly from the combustion chamber 1, the heat loss can be reduced by allowing the core 16 to occupy a central region of the combustion chamber 1 to thereby concentrate the flow of the combustion chamber around and in the vicinity of the combustion chamber 1.

Embodiment 10

Figure 10:
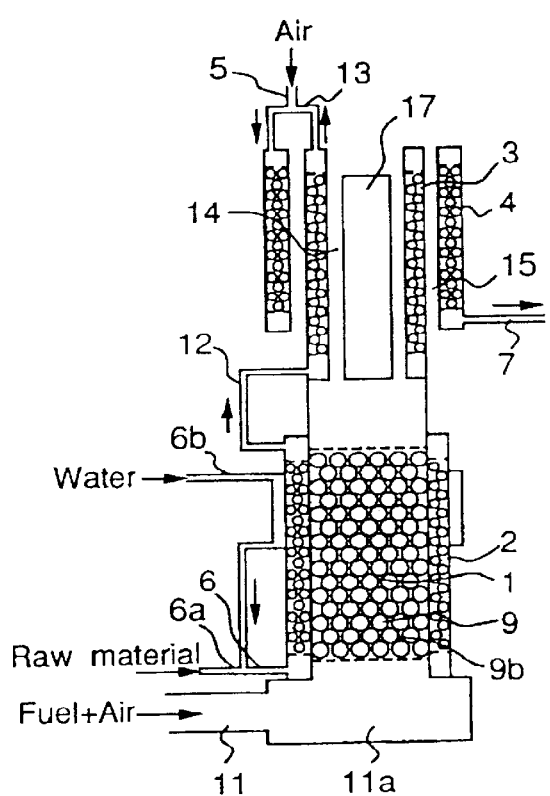
FIG. 10 is a schematic unital view showing the reforming apparatus according to Embodiment 10 of the present invention.

The reforming apparatus according to a tenth preferred embodiment will be described. This reforming apparatus is of a structure, as shown in FIG. 10, in which in the eighth embodiment an inflammable core 17 is disposed centrally within the exhaust chamber 4. This core 17 has a hollow and has a small heat capacity. The role of this core 17 is similar to that in the ninth embodiment to constrict a gas flow passage inside the exhaust chamber 4 for the passage of the combustion exhaust gas to allow the flow to be accelerated, wherefore the efficiency of heat exchange between it and the shift reaction unit 3 can be increased. Also, the core 17 prevents the combustion gas from flowing into a center region of the exhaust chamber 14 which does little participate in heating of the shift reaction unit 3, to thereby reduce the heat loss.

Embodiment 11

Figure 11:
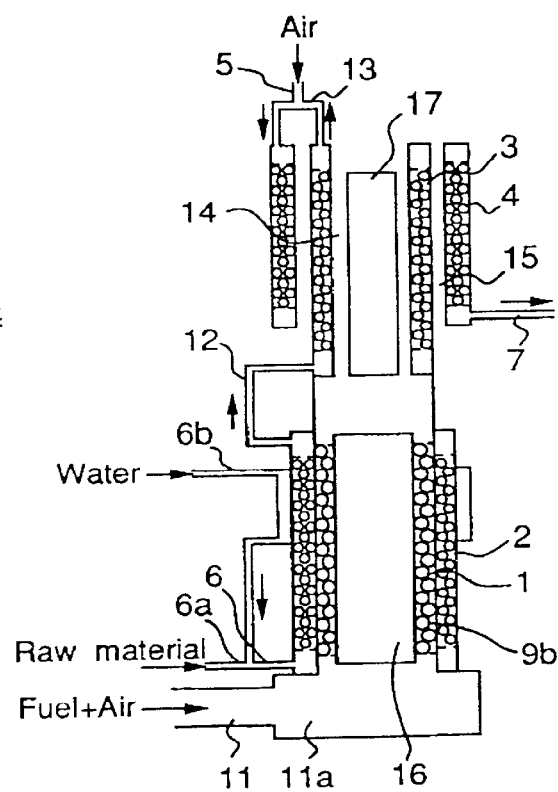
FIG. 11 is a schematic unital view showing the reforming apparatus according to Embodiment 11 of the present invention.

Hereinafter, the reforming apparatus according to an eleventh embodiment will be described. This reforming apparatus is of a structure, as shown in FIG. 11, in which in the eighth embodiment the cores 16 and 17 are disposed centrally within the combustion chamber 1 and the exhaust chamber 4, respectively. With this reforming apparatus, cumulative effects similar to those described in connection with the ninth and tenth embodiments can be obtained.

Embodiment 12

Figure 12:
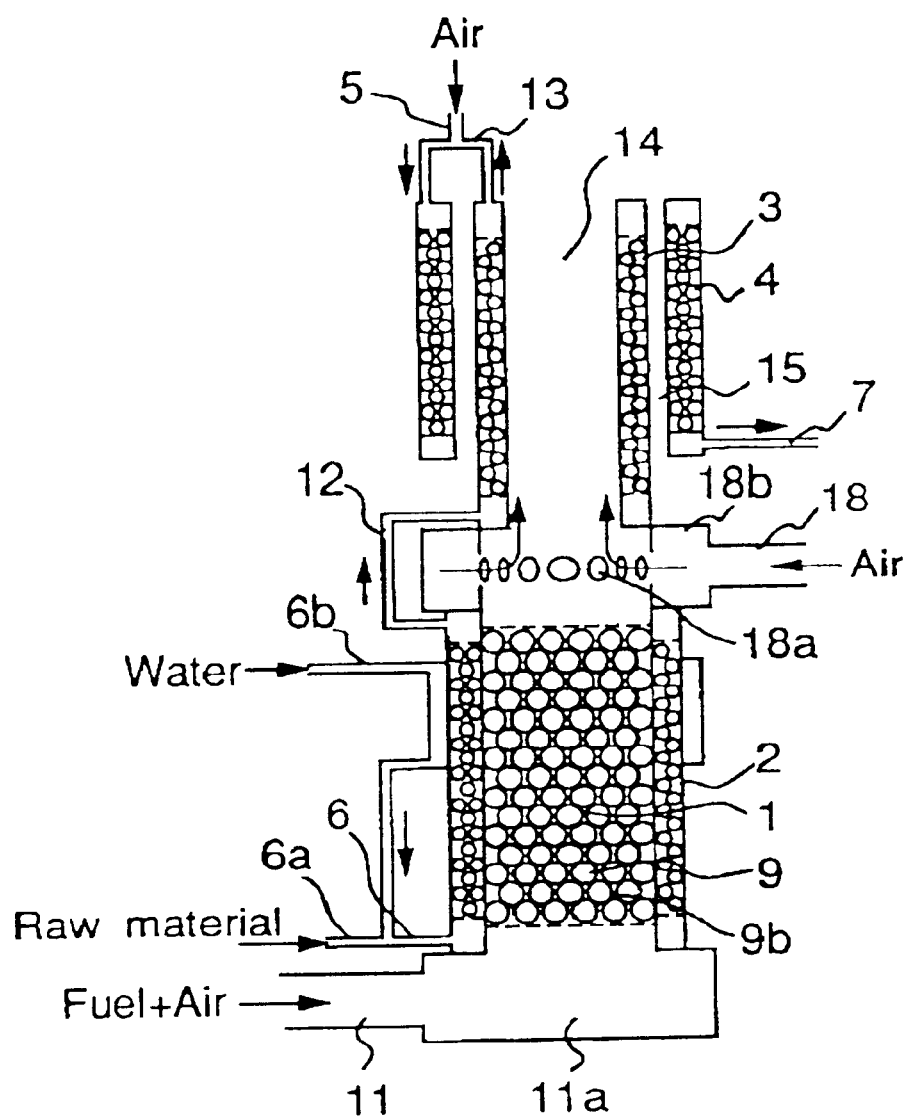
FIG. 12 is a schematic unital view showing the reforming apparatus according to Embodiment 12 of the present invention.
Figure 13:
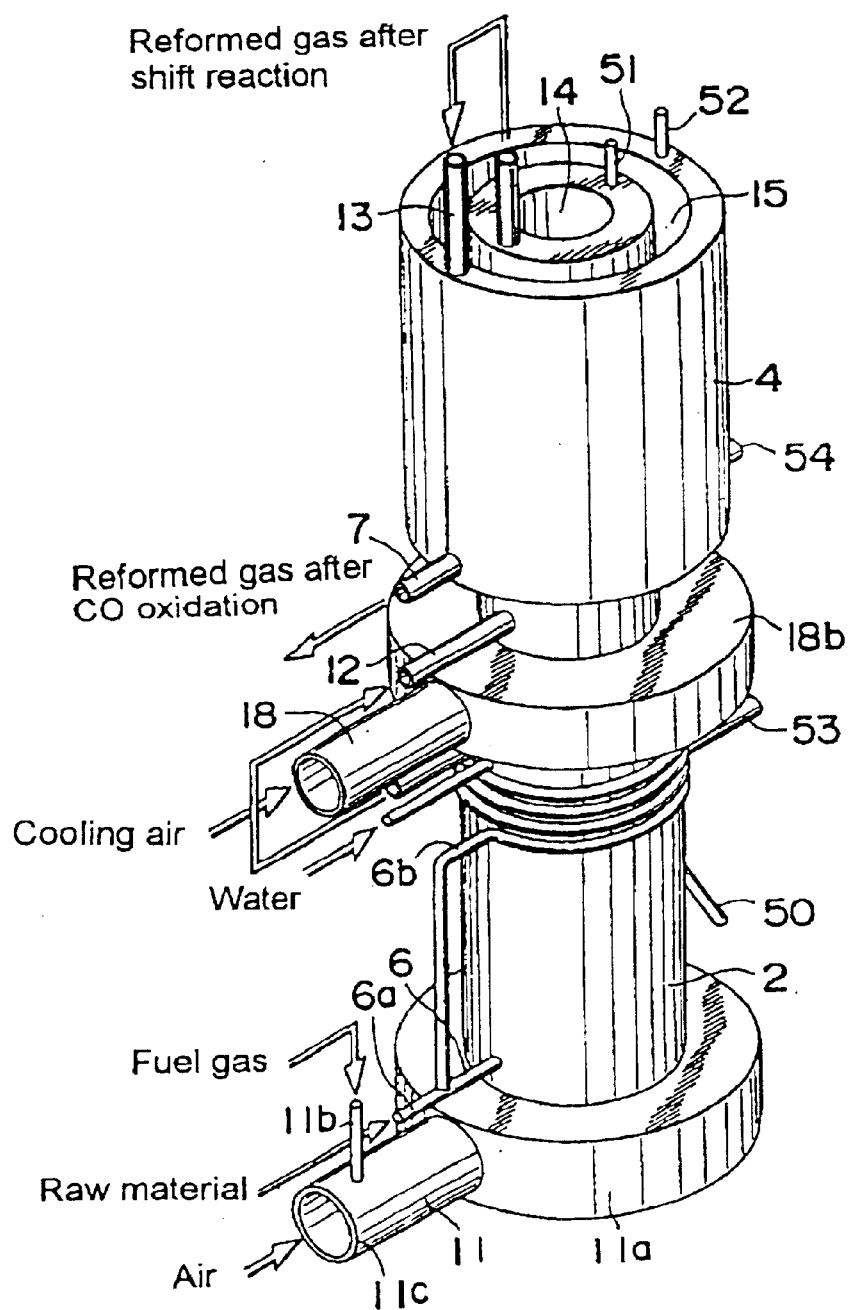
FIG. 13 is a perspective view of the reforming apparatus according to embodiment 12.

Hereinafter, the reforming apparatus according to a twelfth embodiment will be described. This reforming apparatus is of a structure, as shown in FIGS. 12 and 13, in which in the eighth embodiment an air intake unit 18 is disposed between the combustion chamber 1 and the exhaust chamber 14 for the introduction of an external air. More specifically, this air intake unit 18 includes an annular flow passage 18 extending around a junction between the combustion chamber 1 and the exhaust chamber 14, and a circular row of openings 18a opening at the junction so that the air drawn from the air intake unit 18 can be introduced uniformly into the passage for the flow of the combustion exhaust gas through the annular flow passage 18 by way of the circular row of the openings 18a. In such case, by appropriately cooling the temperature of the combustion exhaust gas of the elevated temperature immediately after emergence from the combustion chamber 1, with the external air introduced from the air intake unit 18 and then supplying it into the exhaust chamber 14 after adjustment of the temperature, the heating temperature of the shift reaction unit 3 can be adjusted. It is to be noted that in the perspective view of FIG. 13, reference numeral 11b represents a fuel pipe through which only the gaseous fuel can be introduced into the fuel supply passage 11, and reference numeral 11c represents an air tube through which air for combustion use can be introduced into the fuel supply passage. Also, reference numeral 50 represents a manhole through which a temperature detecting means such as, for example, a thermocouple can be inserted in the reforming reaction unit 2, reference numeral 51 represents a thermocouple manhole through which a temperature detecting means such as, for example, a thermocouple can be inserted in the CO oxidizing unit 4, reference numeral 52 represents a thermocouple manhole through which a temperature detecting means such as, for example, a thermocouple can be inserted in the shift reaction unit 3, and reference numeral 53 represents a filling port for the reforming catalyst.

Embodiment 13

A thirteenth embodiment will now be described. This reforming apparatus is of a structure, as shown in FIG. 14, in which in the twelfth embodiment the cores 16 and 17 are disposed centrally within the combustion chamber 1 and the exhaust chamber 14, respectively. In this case, cumulative effects similar to those described in connection with the eleventh and twelfth embodiments can be obtained.

Embodiment 14

The reforming apparatus according to a fourteenth embodiment will be described hereinafter. This reforming apparatus is of a structure, as shown in FIG. 15, in which in the eleventh embodiment a heat conductive material 19 having a higher heat conductivity than that exhibited by the material forming a surface of each of the reforming reaction unit 2, the shift reaction unit 3 and the CO oxidizing unit 4 is disposed on such surface. This heat conductive material 19 serves to uniformalize the distribution of temperature in each 0f the reaction units with respect to the direction of flow of the gas. In other words, in each of the reaction units, the temperature difference tends to be created in a direction conforming to the direction of flow of the gas in such a way that, for example, since in the reforming reaction unit 2 an endothermic reaction takes place, the temperature on a leeward side tends to lower whereas since in the shift reaction unit 4 and the CO oxidizing unit 4 an exothermic reaction takes place, the temperature on a windward side tends to increase. The heat conductive material 19 provided on the respective surfaces of the reaction units serves to uniformalize this temperature difference by heat conduction. The surface material of the reaction units, although sufficient if it has a high heat conductivity, is used in the form of, for example, stainless steel in view of the fact that corrosion resistance and durability are required as well and, in contrast thereto, the heat conductive material 19 is employed in the form of copper or aluminum. Although they are inferior in that the heat resistance and the strength are lower than those of the stainless steel, they are excellent in heat conductivity.

Embodiment 15

The reforming apparatus according to a fifteenth embodiment will be described hereinafter. The reforming apparatus is of a structure, as shown in FIG. 16, in which in the twelfth embodiment the core 16 is disposed centrally within the combustion chamber 1 and a burner 20 as an auxiliary heating means is disposed within a junction between the combustion chamber 1 and the exhaust chamber 14 for heating the exhaust chamber 14. In this figure, reference numeral 21 represents an igniter for the burner 20. This burner 20 is used to heat the exhaust chamber 14 when the heating temperature of the shift reaction unit 3 is low and can also be used to preheat the shift reaction unit 3 at an initial stage of formation of the reformed gas.

Embodiment 16

The reforming apparatus according to a sixteenth embodiment will now be described. This reforming apparatus is of a structure, as shown in FIG. 17, in which in the fifteenth embodiment a filling unit for accommodating a combustion catalyst 22 is disposed within the exhaust chamber 14 and a catalyst net 23 made of a combustion catalyst is provided at an entrance to the exhaust chamber 14. In this reforming apparatus, the burner 20 can be used not only in a manner similar to that used in the fifteenth embodiment, but also as an auxiliary heating means for the exhaust chamber 14 by initially heating the catalyst net 23 and the combustion catalyst 22 by means of flames from the burner 20. It is to be noted that for combustion of the combustion catalyst 22, the burner 20 and the fuel supplied from the air intake unit 18 and oxygen remaining in the combustion exhaust gas from the combustion chamber 1, and air supplied from the air intake unit 18 are utilized.

Figure 18:
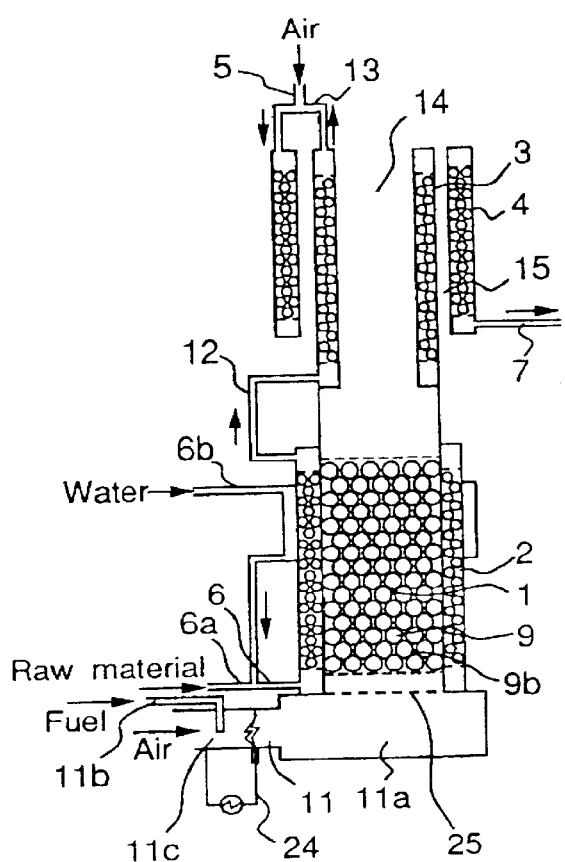
FIG. 18 is a schematic unital view showing the reforming apparatus according to Embodiment 17 of the present invention.

The reforming apparatus according to a seventeenth embodiment will be described subsequently. This reforming apparatus is of a structure, as shown in FIG. 18, in which in the eighth embodiment as a preheating means for preheating the combustion catalyst 9b within the combustion chamber 1 a catalyst net made of combustion catalyst is provided at an entrance to the combustion chamber 1 and an ignition device 24 is provided in the fuel supply passage 6. While if the heat generating source in the combustion chamber 1 is a combustion of the catalyst, no combustion reaction is initiated if the temperature of the combustion catalyst 9 is increased a certain extent, the gaseous fuel is ignited by the ignition device 24 to cause the catalyst net 25, that is relatively easy to be heated, to initiate the combustion reaction to thereby preheat the combustion catalyst 9 so that at an initial stage of the beginning of the combustion, combustion can be initiated immediately.

Embodiment 18

Figure 19:
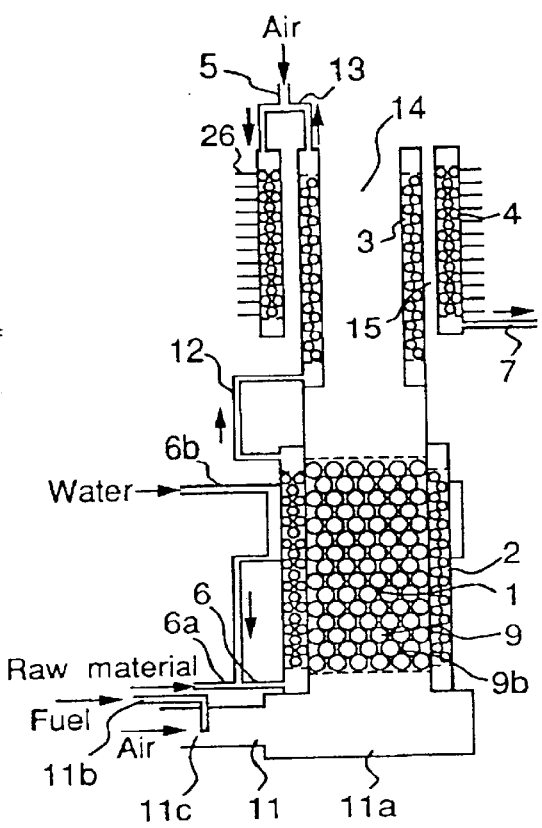
FIG. 19 is a schematic unital view showing the reforming apparatus according to Embodiment 18 of the present invention.

The reforming apparatus according to an eighteenth embodiment will now be described. This reforming apparatus is of a structure, as shown in FIG. 19, in which in the eighth embodiment cooling fins 26 are disposed around the CO oxidizing unit 4. In such case, the temperature control of the CO oxidizing unit 4, that is one of the various reaction units which requires a lower reaction temperature of all, can be carried out by causing heat to be dissipated by the cooling fins 26.

Figure 20A:
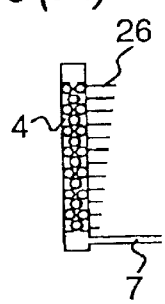
FIG. 20(A) and FIG. 20(B) are unital views respectively showing a portion of modified forms of the reforming apparatus according to Embodiment 18.
Figure 20B:
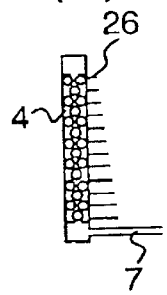

At this time, the amount of heat dissipated from the cooling fins 26 can be adjusted by suitably selecting the number and/or length of each fin and/or selecting a manner in which a cooling wind is applied. Also, as shown in FIGS. 20(A) and 20(B), by varying the height of the cooling fins 26 along the direction of flow of the gas in the CO oxidizing unit 4, the pattern of distribution of temperature within the CO oxidizing unit 4 can be redressed.

Embodiment 19

Figure 21:
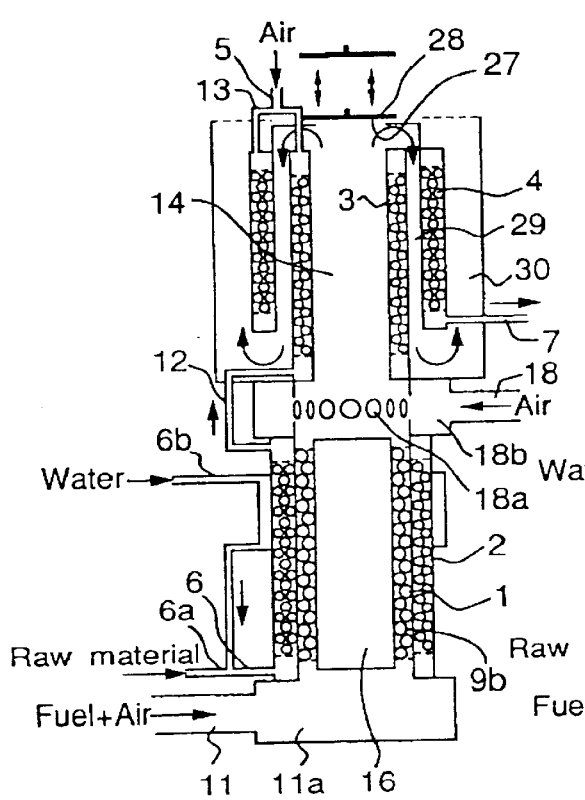
FIG. 21 is a schematic unital view showing the reforming apparatus according to Embodiment 19 of the present invention.

Hereinafter, the reforming apparatus according to a nineteenth embodiment will be described. This reforming apparatus is of a structure, as shown in FIG. 21, in which in the twelfth embodiment, a lid 28 is provided at an exhaust port 27, through which a combustion gas within the exhaust chamber 14 can be discharged to the outside, for selectively opening and closing the exhaust port 27 and, on the other hand, a first duct 29 branched from and communicated with the exhaust chamber 14 is defined between the shift reaction unit 3 and the CO oxidizing unit 4 and a second duct 30 communicated with the first duct 29 is formed externally around the CO oxidizing unit 4. The first duct 29 is communicated with an upper end of the exhaust chamber 14, and the second duct is communicated at a lower end with a lower end of the first duct 29. The second duct 30 has an upper end open to the outside for discharge of the exhaust gas.

In this reforming apparatus, by dosing the exhaust port 27 with the lid 28, the combustion exhaust gas within the exhaust chamber 14, the combustion exhaust gas within the exhaust chamber 14 flows into the first duct 29 and then into the second duct 30 and, at this time, the shift reaction unit 3 and the CO oxidizing unit 4 are heated too by the combustion exhaust gas flowing through the first and second ducts 29 and 30, respectively. On the other hand, if the exhaust port 27 is opened with the lid 28 opened, the combustion exhaust gas within the exhaust chamber 14 is discharged to the outside through the exhaust port 27 and does not flow through any one of the first and second ducts 29 and 30. Accordingly, by selectively opening and closing the exhaust port 27 with the lid 28, the temperature control of the shift reaction unit 3 and the CO oxidizing unit 4 can be accomplished as desired.

Embodiment 20

Figure 22:
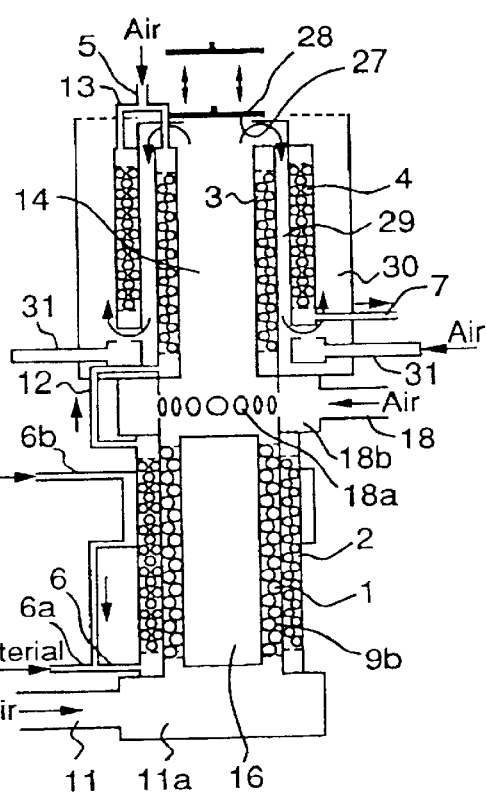
FIG. 22 is a schematic unital view showing the reforming apparatus according to Embodiment 20 of the present invention.

The reforming apparatus according to a twentieth embodiment will hereinafter be described. This reforming apparatus is of a structure, as shown in FIG. 22, in which in the nineteenth embodiment, an air intake unit 31 for introducing an external air into the second duct 30 is employed. This air intake unit 31 opens at a communication between the first and second ducts 29 and 30 to introduce the external air thereto. In such case, by introducing the external air from the air intake unit 31 into the second duct 20, the CO oxidizing unit 4 can be cooled to accomplish a temperature control thereof.

Embodiment 21

The reforming apparatus according to a twenty-first preferred embodiment of the present invention will be described. This twenty-first embodiment provides a basic structure of the reforming apparatus while a group of twenty-first to twenty-fourth embodiments of the present invention make use of component parts of the reforming apparatus that are similar to those employed in the basic structure according to the twenty-first embodiment of the present invention.

Figures 23A, 23B:
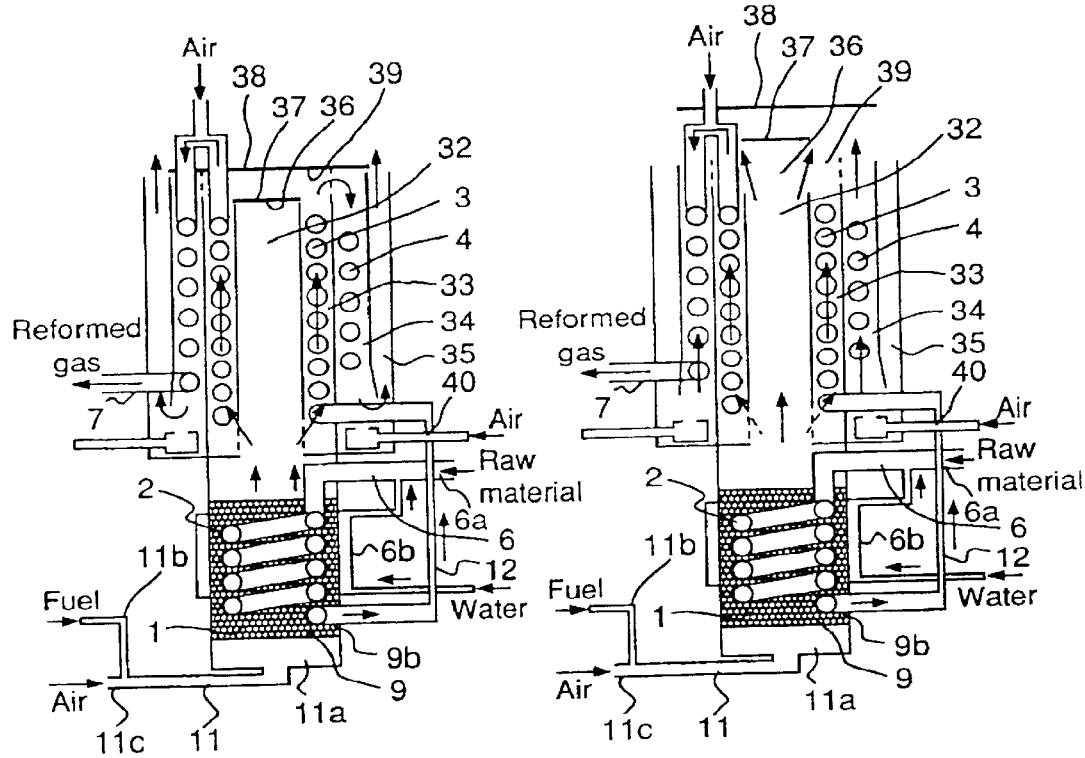
FIG. 23(A) is a schematic unital view showing the reforming apparatus according to Embodiment 21 of the present invention, the apparatus being in a starting state.
FIG. 23(B) is a schematic unital view showing the reforming apparatus according to Embodiment 21 of the present invention, the apparatus being in a state during steady running.

The reforming apparatus according to the twenty-first embodiment comprises, as shown in FIGS. 23(A) and 23(B), a generally cylindrical combustion chamber 1 arranged with its longitudinal axis oriented vertically, and a reforming reaction unit 2 in the form of a coil accommodated coaxially within the combustion chamber 1. The combustion chamber 1 has an upper portion formed with a main discharge port 36 that is provided with a first lid 37 serving as a sluice means for selectively opening and closing the main discharge port 36. A main exhaust chamber 32 is externally surrounded by a first duct 33 communicated with the main exhaust chamber 32 through a branch off from the main exhaust chamber 32, which duct 33 is in turn surrounded by a second duct 34 communicated with the first duct 33. A shift reaction unit 3 is disposed within the first duct 33 and a CO oxidizing unit 4 is disposed within the second duct 34.

The combustion chamber 1 is filled with a combustion catalyst 9b serving as a combustion means 9. The combustion chamber 1 has a lower end fluid-coupled with a fuel supply passage 11 for supplying therethrough a gaseous fuel and an air for use in combustion. This fuel supply passage has a hole 11a defined at a location adjacent an entrance to the combustion chamber 1 so that the gaseous fuel can be supplied uniformly into the combustion chamber 1. It is to be noted that in the combustion chamber 1 a burner may be employed as the combustion means 9.

The reforming reaction unit 2 comprises a coiled pipe filled with a reforming catalyst and has an upper end portion led outwardly from an upper portion of the combustion chamber 1 and fluid-connected with a raw material supply path 6. This raw material supply path 6 includes a raw material pipe 6a for the supply of only a reforming raw material therethrough and a steam pipe 6b for the supply of a steam (water) therethrough, both of said pipes 6a and 6b being joined together on their length. The steam pipe 6b has a portion disposed having been coiled around and in contact with the outer periphery of the combustion chamber 1 so that it can be preheated by heat evolved from the combustion chamber 1. The reforming reaction unit 2 has a lower end portion led outwardly from a lower end of the combustion chamber 1 and is in turn fluid-connected with a connection tube 12 that connects the reforming reaction unit 2 and the shift reaction unit 3 together.

The shift reaction unit 3 is in the form of a coiled pipe filled with a shift catalyst therein and is introduced within the first duct 33 so as to extend from bottom to top while being wound spirally in the first duct 33. The connection tube 12 referred to above is fluid-connected with a lower end of the shift reaction unit 3

The CO oxidizing unit 4 is in the form of a coiled pipe filled with a CO oxidizing catalyst therein and is introduced within the second duct 34 so as to extend from top to bottom while being wound spirally in the second duct 34. The CO oxidizing unit 4 has an upper end portion fluid-connected with an upper end portion of the shift reaction unit 3 through a connection tube 13. This connection tube 13 is provided with an air supply passage 5 for the introduction of air necessitated by and in the CO oxidizing unit 4. The CO oxidizing unit 4 has a lower end portion fluid-connected with a reformed gas discharge passage 7 for drawing the reformed gas outwardly therethrough.

The first duct 33 is communicated at a lower end thereof with the main exhaust chamber 32 and at an upper end thereof with the second duct 34. Also, a sub-discharge port 39 for the discharge of a combustion exhaust gas inside it to the outside thereof is provided on the upper end of the first duct 33. The second duct 34 has an outer periphery formed with a third duct 35 that is communicated with the second duct 34 at a lower end thereof. The second and third ducts 34 and 35 have their upper ends open to the outside. The second duct 32 has a lower end provided with an air supply passage 40 through which an external air is introduced into it.

The main discharge port 36 at the upper end of the main exhaust chamber 32 is positioned at a level somewhat lower than the level of the respective upper ends of the first to third ducts. Also, the reforming apparatus has an upper end provided with a second lid 38 detachably mounted thereon so as to overlay an upper region of the main discharge opening 36 and the respective upper ends of the first and second ducts.

In this reforming apparatus, respective openings of the main discharge port 36, the sub-discharge port 39 and the upper end of the second duct 34 are closed as shown in FIG. 23(A) when the first and second lids 37 and 38 are simultaneously closed. When while in this condition combustion takes place inside the combustion chamber 1, the combustion exhaust gas flows from the combustion chamber 1 into the first duct 33 so as to travel upwardly, then deflected at the upper end portion of the first duct 33 so as to travel downwardly within the second duct 34 and discharged to the outside after having again deflected at the lower end portion of the second duct 34 so as to travel upwardly within the third duct. At this time, the reforming reaction unit 2 is exposed to and hence heated by the combustion gas of an elevated temperature within the combustion chamber 1, and the shift reaction unit 3 inside the first duct 33 and the CO oxidizing unit 4 inside the second duct 34 are heated by the combustion exhaust gas emerging outwardly from the combustion chamber 1. In this way, each of the reaction units is preheated.

When the first and second lids 37 and 38 are opened to open the respective openings of the main discharge port 36, the sub-discharge port 39 and the upper end of the second duct 34 are closed as shown in FIG. 23(B), the combustion exhaust gas from the combustion chamber 1 is discharged mainly from the main discharge port 36 via the main exhaust chamber 32 and in a slight quantity from the sub-discharge port 39 by way of the first duct 33, and hence, the combustion exhaust gas little flows through the second duct 34. At this time, the shift reaction unit 3 is heated by the slight quantity of the combustion exhaust gas then flowing therethrough, radiation and heat transmission in solid from the main exhaust chamber 32 and heat evolved in the reforming gas itself then flowing therein. Accordingly, the shift reaction unit 3 has a temperature controlled to a value lower than that of the reforming reaction unit 2. On the other hand, the CO oxidizing unit 4 is heated by the radiation and heat transmission in solid from the shift reaction unit 3 and heat evolved in the reforming gas itself then flowing therein. This CO oxidizing unit 4 has a temperature controlled to a value lower than that of the shift reaction unit 3 since it is not heated by the combustion exhaust gas and, also, the radiation and the heat transmission in solid have been weakened. Where the temperature of the CO oxidizing unit 4 is desired to be controlled to a further lower value, the external air has to be introduced from the air supply passage 40 into the second duct 34. It is to be noted that the timing at which the first and second lids 37 and 38 are opened or closed is adjustable as desired.

As described above, with the reforming apparatus, at the time of initial run of the apparatus before an actual production of the reformed gas, both of the reforming reaction unit 2 and the shift reaction unit 3 and the CO oxidizing unit 4 can be preheated by effecting combustion within the combustion chamber 1 while the first and second lids 37 and 38 have been closed, whereas during routine run of the apparatus, the first and second lids 37 and 38 are opened to allow the temperature of each of the units to be controlled optimally.

Embodiment 22

Figure 24:
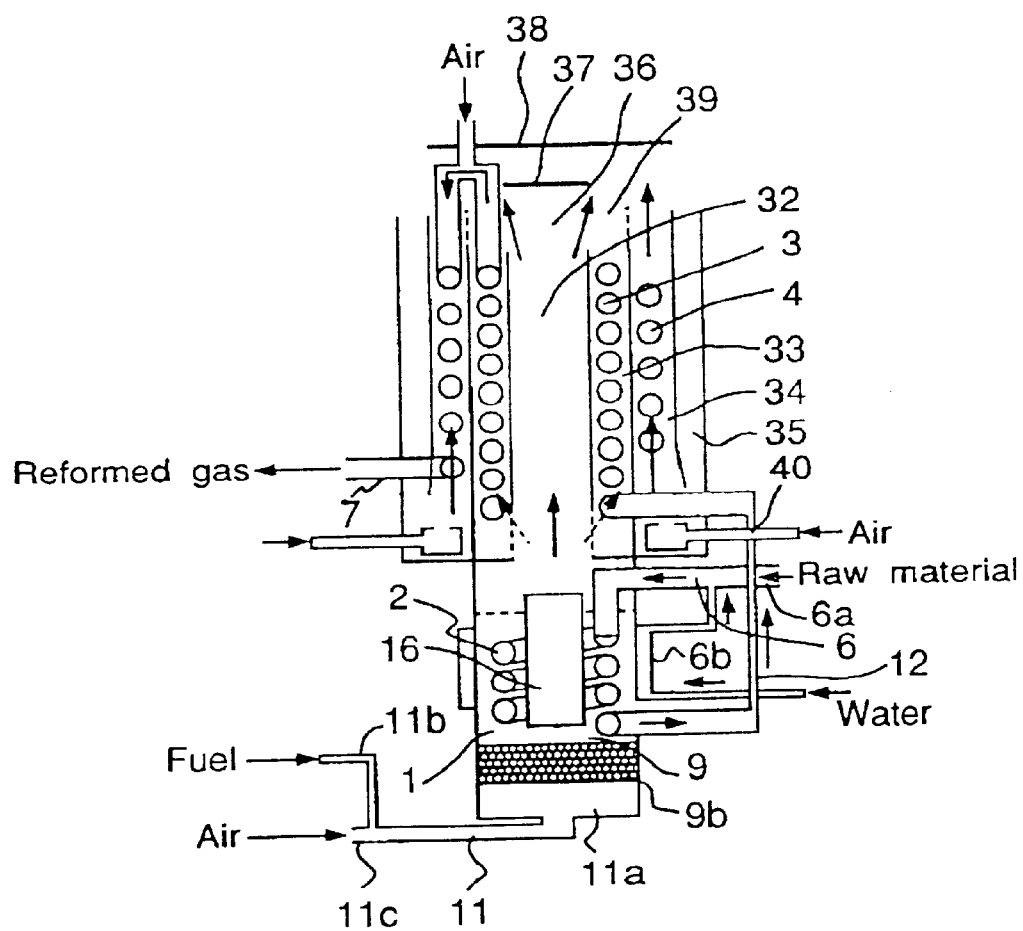
FIG. 24 is a schematic unital view showing the reforming apparatus according to Embodiment 22 of the present invention.

The reforming apparatus according to a twenty-second preferred embodiment of the present invention will now be described. This reforming apparatus is of a structure in which in the twenty-first embodiment, an inflammable core 16 is disposed centrally within the combustion chamber 1 as shown in FIG. 24. Because of the presence of the inflammable core 16, a gas flow passage inside the combustion chamber 1 is constricted to allow the flow to be accelerated, wherefore the efficiency of heat exchange between the reforming reaction unit 2 and the combustion gas can be increased. Also, in the combustion chamber 1, the combustion catalyst 9b is filled only in a lower portion of the combustion chamber 1. In other words, even though the combustion catalyst 9b is not filled entirely within the combustion chamber 1, the combustion reaction proceeds sufficiently and, therefore, the loss of pressure of the combustion gas can be reduced by elimination of an excessive quantity of the combustion catalyst 9b.

Embodiment 23

Figure 25:
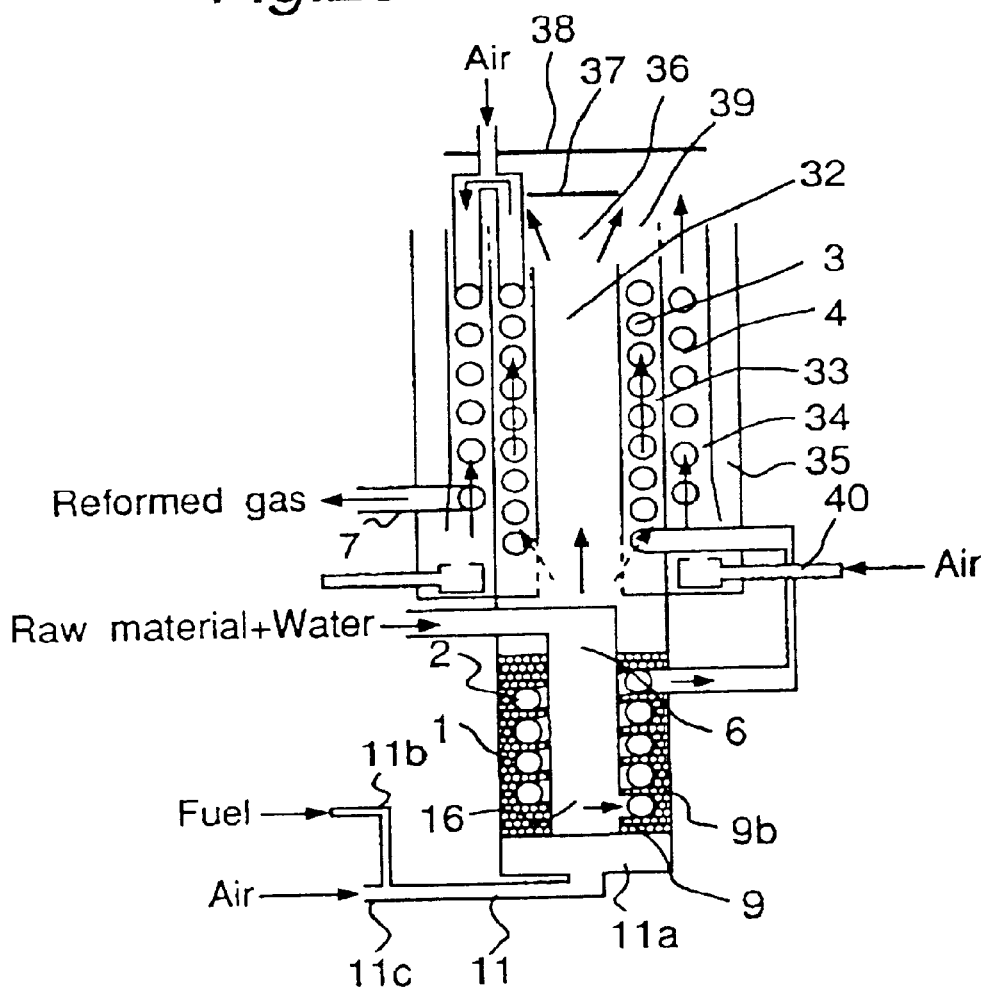
FIG. 25 is a schematic unital view showing the reforming apparatus according to Embodiment 23 of the present invention.

The reforming apparatus according to a twenty-third embodiment will be described. This reforming apparatus is of a structure wherein in the twenty-first embodiment, a hollow core 16 is disposed centrally within the combustion chamber 1, as shown in FIG. 25, so that the hollow of the core 16 can be used as the raw material supply path 6 for supplying both of the reforming raw material and the steam into the reforming reaction unit 2. In this case, not only can both of the reforming raw material and the steam be preheated within the core 16, but the steam can also be generated inside the core 16.

Embodiment 24

Figure 26:
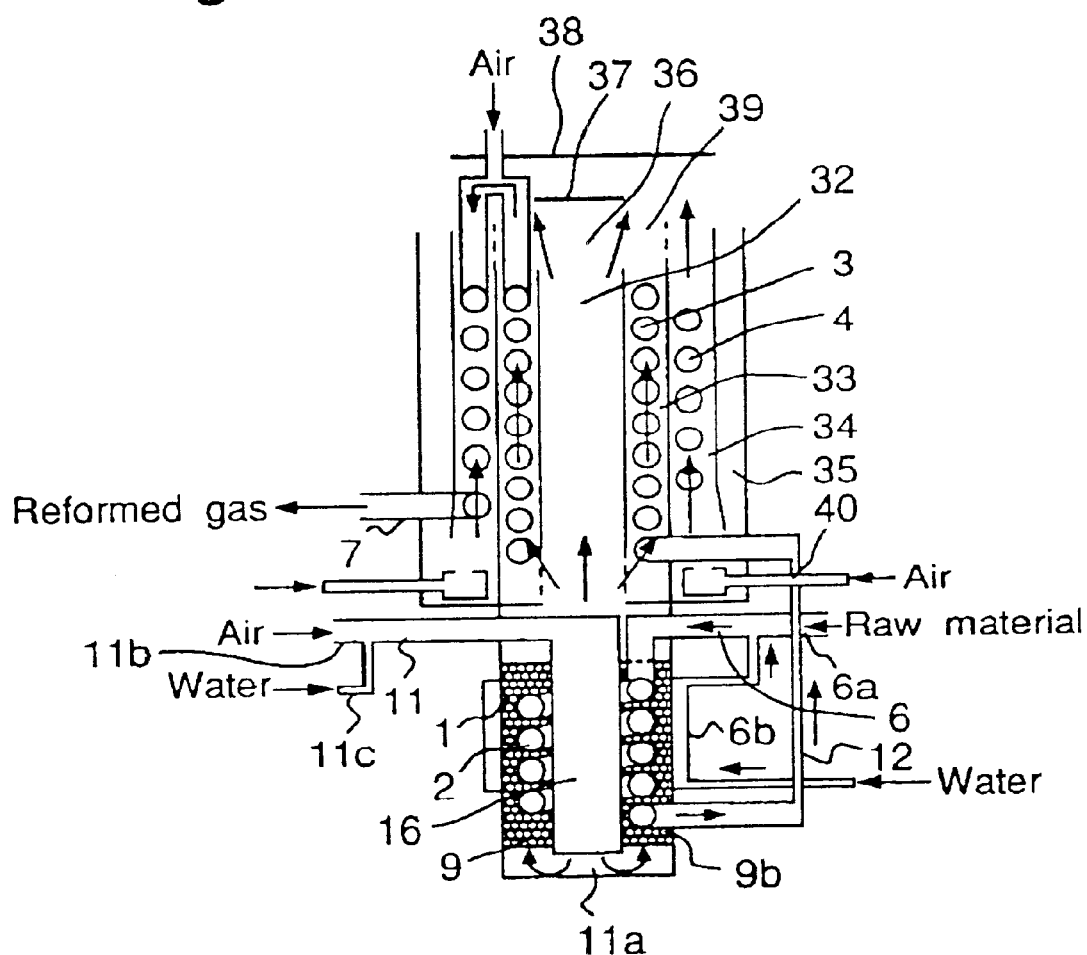
FIG. 26 is a schematic unital view showing the reforming apparatus according to Embodiment 24 of the present invention.

The reforming apparatus according to a twenty-fourth embodiment will be described. This reforming apparatus is, as shown in FIG. 26, of a structure in which in the twenty-second embodiment the core 16 is used as the fuel supply passage 11 so that both of the fuel and the combustion air can be supplied to the combustion catalyst 9b within the combustion chamber 1. In this case, since the fuel and the combustion air can be supplied to the combustion catalyst 9b within the combustion chamber 1 after having been preheated, the combustion reaction by the combustion catalyst 9 can be accelerated favorably.

Embodiment 25

Figure 27A:
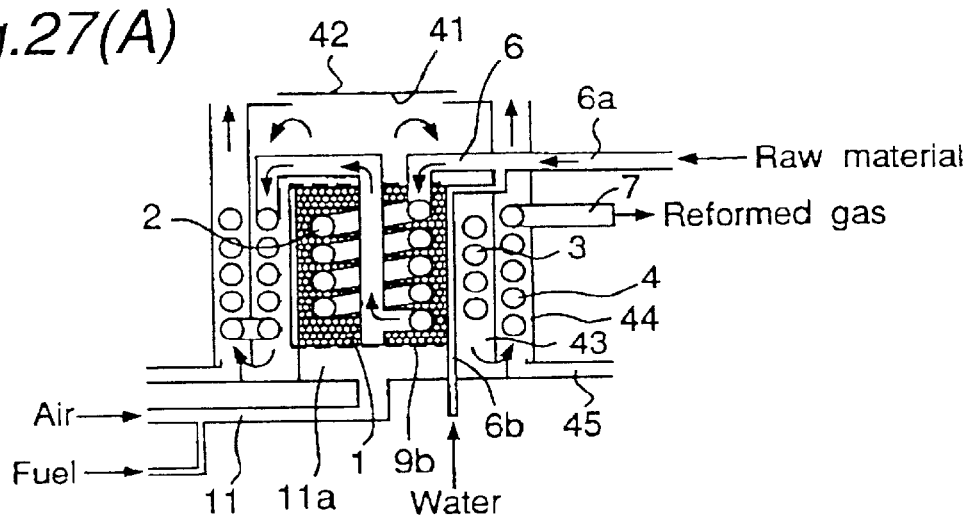
FIG. 27(A) is a schematic unital view showing the reforming apparatus according to Embodiment 25 of the present invention, the apparatus being in a starting state.
Figure 27B:
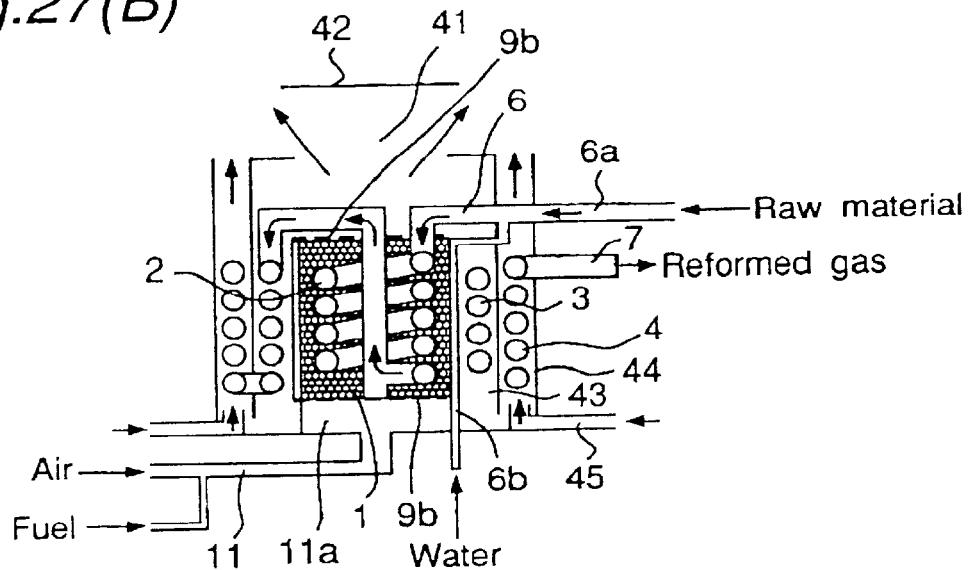
FIG. 27(B) is a schematic unital view showing the reforming apparatus according to Embodiment 25 of the present invention, the apparatus being in a state during steady running.

The reforming apparatus according to a twenty-fifth embodiment will now be described. This reforming apparatus comprises, as shown in FIGS. 27(A) and 27(B), a generally cylindrical combustion chamber 1 arranged with its longitudinal axis oriented vertically, and a reforming reaction unit in the form of a coil accommodated coaxially within the combustion chamber 1. The combustion chamber 1 has an upper portion formed with a main discharge port 41 for the direct discharge of the combustion exhaust gas from the combustion chamber 1 to the outside, which port 41 is provided with a lid 42 serving as a sluice means for selectively opening and closing the main discharge port 41. The combustion chamber 1 has an outer perimeter surrounded by a first duct 43 communicated at a top portion of a side wall of the combustion chamber 1, which is in turn surrounded by a second duct 44 communicated with a lower end portion of the first duct 43. A shift reaction unit 3 in the form of a coil is disposed within the first duct 43 and a CO oxidizing unit 4 in the form of a coil is disposed within the second duct 44.

The combustion chamber 1 is filled with a combustion catalyst 9b serving as a combustion means 9. The combustion chamber 1 has a lower end fluid-coupled with a fuel supply passage 11 for supplying therethrough a gaseous fuel and a combustion air for use in combustion. This fuel supply passage 11 has a hole 11a defined at a location adjacent an entrance to the combustion chamber 1 so that the gaseous fuel can be supplied uniformly into the combustion chamber 1. It is to be noted that in the combustion chamber 1 a burner may be employed as the combustion means 9.

The reforming reaction unit 2 comprises a coiled pipe filled with a reforming catalyst and has an upper end portion led outwardly from the upper portion of the combustion chamber 1 and fluid-connected with a raw material supply path 6. This raw material supply path 6 includes a raw material pipe 6a for the supply of only a reforming raw material therethrough and a steam pipe 6b for the supply of a steam (water) therethrough, both of said pipes 6a and 6b being joined together on their length. The steam pipe 6b has a portion disposed having been coiled around and in contact with the outer periphery of the combustion chamber 1 so that it can be preheated by heat evolved from the combustion chamber 1. The reforming reaction unit 2 has a lower end portion fluid-connected with an upper end portion of the shift reaction unit 3 through a connection tube that is led outwardly from the upper portion of the combustion chamber 1 after having extended through a center region of the combustion chamber 1.

The shift reaction unit 3 is in the form of a coiled pipe filled with a shift catalyst therein and is introduced within the first duct 43 so as to extend from top to bottom while being wound spirally in the first duct 43.

The CO oxidizing unit 4 is in the form of a coiled pipe filled with a CO oxidizing catalyst therein and is introduced within the second duct 44 so as to extend from bottom to top while being wound spirally in the second duct 44. The CO oxidizing unit 4 has a lower end portion fluid-connected with a lower end portion of the shift reaction unit 3 through a connection tube. This connection tube is provided with an air supply passage 5 for the introduction of air necessitated by and in the CO oxidizing unit 4. The CO oxidizing unit 4 has an upper end portion fluid-connected with a reformed gas discharge passage 7 for drawing the reformed gas outwardly therethrough.

The second duct 44 has a lower end portion provided with an air supply passage 45 through which an external air is introduced into it.

In this reforming apparatus, when the lid 42 is closed to close the main discharge port 41 as shown in FIG. 27(A) and combustion takes place within the combustion chamber 1, the combustion exhaust gas from the combustion chamber 1 flows downwardly through the first duct 43 and subsequently flows upwardly through the second duct 4 before it is discharged to the outside. At this time, the reforming reaction unit 2 is exposed to and heated by the combustion gas of an elevated temperature within the combustion chamber 1, and the shift reaction unit 3 within the first duct 43 and the CO oxidizing unit 4 within the second duct 44 are heated by the combustion exhaust gas emerging outwardly from the combustion chamber. In this way, each of the reaction units is preheated.

On the other hand, when the lid 42 is removed to open the exhaust port 41 as shown in FIG. 27(B), the combustion exhaust gas from the combustion chamber 1 is discharged mainly from the main discharge port 41 and flows little through any one of the first and second ducts 43 and 44. At this time, the shift reaction unit 3 is heated by the radiation and heat transmission in solid from the combustion chamber 1 and also by the heat evolved in the reforming gas flowing therethrough. Accordingly, the shift reaction unit 3 can have its temperature controlled to a lower value than that of the reforming reaction unit 2. On the other hand, the CO oxidizing unit 4 is heated by the radiation and heat transmission in solid from the shift reaction unit 3 and the first duct 43 and also by the heat evolved in the reforming gas flowing therethrough. This CO oxidizing unit 4 has a temperature controlled to a value lower than that of the shift reaction unit 3 since it is not heated by the combustion exhaust gas and, also, the radiation and the heat transmission in solid have been weakened as compared with those in the shift reaction unit 3. Where the temperature of the CO oxidizing unit 4 is desired to be controlled to a further lower value, the external air has to be introduced from the air supply passage 45 into the second duct 44.

As described above, with the reforming apparatus, at the time of initial run of the apparatus before an actual production of the reformed gas, both of the reforming reaction unit 2 and the shift reaction unit 3 and the CO oxidizing unit 4 can be preheated by effecting combustion within the combustion chamber 1 while the first lid 41 has been closed, whereas during routine run of the apparatus, the first lid 41 opened to allow the temperature of each of the units to be controlled optimally.

INDUSTRIAL APPLICABILITY

The reforming apparatus according to the present invention is useful in providing a reformed gas for use as an electricity generating fuel in, for example, fuel cells. That is, with the reforming apparatus, since the temperature of and in each of the reaction units can be controlled optimally, the high-quality reformed gas with the CO concentration reduced sufficiently can be manufactured. In particular, since each of the reaction units is integrally incorporated, it is easy to design compact and is effective to downsize the fuel cell system.

What is claimed is:

1. A reforming apparatus comprising an integrated structure of three separate units, comprising:

a raw material reforming unit for steam-reforming a raw material to be reformed and producing a reformed gas containing hydrogen as a principal component, including a heat source that generates heat by combustion of a fuel gas, operable to directly obtain heat for the steam reformation reaction from said heat source;

a shift reaction unit for decreasing, by water-gas-shift reaction, CO contained in the reformed gas produced in said raw material reforming unit; and a CO oxidation unit for further decreasing, by oxidation, CO contained in reformed gas treated in said shift reaction unit;

said raw material reforming unit and said shift reaction unit contain different catalysts, and said shift reaction unit and said CO oxidation unit being arranged in a manner that said shift reaction unit and said CO oxidation unit can be indirectly heated by heat transfer from the heat source of said raw material reforming unit, and further said CO oxidation unit including an outside surface, and being arranged to obtain atmospheric cooling of the outside surface; and said raw material reforming unit, said shift reaction unit and said CO oxidization unit are concentrically arranged relative to each other with said CO oxidization unit placed on an outer peripheral side of the reforming apparatus.

2. The reforming apparatus according to claim 1, wherein said raw material reforming unit comprises a generally cylindrical combustion chamber as the heat source and a reforming reaction unit for steam-reforming the raw material to produce the reformed gas containing hydrogen as a principal component, said reforming reaction unit, said shift reaction unit and said CO oxidation unit are concentrically arranged relative to said combustion chamber.

3. The reforming apparatus according to claim 2, wherein said reforming reaction unit is concentrically accommodated within said combustion chamber.

4. The reforming apparatus according to claim 2, wherein said reforming reaction unit is positioned outside said combustion chamber in contact therewith.

5. The reforming apparatus according to claim 2, said combustion chamber comprising a center, and further comprising an incombustible core arranged at the center of said combustion chamber.

6. The reforming apparatus according to claim 2, wherein both of said shift reaction unit and said CO oxidation unit are positioned outside said reforming reaction unit.

7. The reforming apparatus according to claim 6, further comprising a partition wall having a function of regulating heat transfer, the partition wall being interposed between said reforming reaction unit and both of said shift reaction unit and said CO oxidation unit.

8. The reforming apparatus according to claim 6, wherein said reforming reaction unit and said shift reaction unit are connected by a flow path detouring outside both of said shift reaction unit and said CO oxidation unit.

9. The reforming apparatus according to claim 6, wherein said shift reaction unit is arranged on a side adjacent to a high temperature zone of said reforming unit and said CO oxidation unit is arranged on a side adjacent a low temperature said of said reforming reaction unit, so as to be in conformity to a temperature distribution within said reforming reaction unit.

10. The reforming apparatus according to claim 1, wherein each of said shift reaction unit and said CO oxidation unit is arranged in a position which is heated by a burned exhaust gas from said heat source of said raw material reforming unit.

11. A reforming apparatus comprising an integrated structure of three separate units, comprising:

a raw material reforming unit for steam-reforming a raw material to be reformed and producing a reformed gas containing hydrogen as a principal component, including a heat source that generates heat by combustion of a fuel gas, operable to directly obtain heat for the steam reformation reaction from said heat source;

a shift reaction unit for decreasing, by water-gas-shift reaction, CO contained in the reformed gas produced in said raw material reforming unit; and a CO oxidation unit for further decreasing, by oxidation, CO contained in reformed gas treated in said shift reaction unit;

said raw material reforming unit and said shift reaction unit contain different catalysts, and said shift reaction unit and said CO oxidation unit being arranged in a manner that said shift reaction unit and said CO oxidation unit can be indirectly heated by heat transfer from the heat source of said raw material reforming unit, and further said CO oxidation unit being arranged in a position outside said raw material reforming unit;

said raw material reforming unit comprising a generally cylindrical combustion chamber as the heat source and a reforming reaction unit for steam-reforming the raw material to produce the reformed gas containing hydrogen as a principal component, said reforming reaction unit, said shift reaction unit and said CO oxidation unit are concentrically arranged relative to said combustion chamber; and further comprising an exhaust chamber, in which a burned exhaust gas from said combustion chamber directly flows, wherein said exhaust chamber is positioned adjacent to and coaxially above said combustion chamber, said shift reaction unit being positioned outside said exhaust chamber, said CO oxidation unit being positioned outside said shift reaction unit.

12. The reforming apparatus according to claim 11, further comprising an air intake for introducing fresh air in between said combustion chamber and said exhaust chamber.

13. The reforming apparatus according to claim 11, further comprising a secondary heating element for heating said exhaust chamber.

14. The reforming apparatus according to claim 11, further comprising an exhaust vent for discharging the burned exhaust gas in said exhaust chamber to the outside, a shutter for selectively opening and closing said exhaust vent, a first duct which is separated from said exhaust chamber and interposed between said shift reaction unit and said CO oxidation unit, and a second duct which is fluid-connected with said first duct and positioned outside said CO oxidation unit.

15. The reforming apparatus according to claim 14, further comprising an air intake for introducing fresh air into said first duct.

16. The reforming apparatus according to claim 12, further comprising an incombustible core arranged at the center of said exhaust chamber.

17. A reforming apparatus comprising an integrated structure of three separate units, comprising:

a raw material reforming unit for steam-reforming a raw material to be reformed and producing a reformed gas containing hydrogen as a principal component, including a heat source that generates heat by combustion of a fuel gas, operable to directly obtain heat for the steam reformation reaction from said heat source;

a shift reaction unit for decreasing, by water-gas-shift reaction, CO contained in the reformed gas produced in said raw material reforming unit; and a CO oxidation unit for further decreasing, by oxidation, CO contained in reformed gas treated in said shift reaction unit;

said raw material reforming unit and said shift reaction unit contain different catalysts, and said shift reaction unit and said CO oxidation unit being arranged in a manner that said shift reaction unit and said CO oxidation unit can be indirectly heated by heat transfer from the heat source of said raw material reforming unit, and further said CO oxidation unit being arranged in a position outside said raw material reforming unit;

said raw material reforming unit comprising a generally cylindrical combustion chamber as the heat source and a reforming reaction unit for steam-reforming the raw material to produce the reformed gas containing hydrogen as a principal component, said reforming reaction unit, said shift reaction unit and said CO oxidation unit are concentrically arranged relative to said combustion chamber; and at least one of said reforming reaction unit, said shift reaction unit and said CO oxidation unit is provided on a surface thereof with a heat transfer material having a higher heat conductivity than that of a material of which said surface is composed.

18. The reforming apparatus according to claim 2, wherein said CO oxidation unit includes fins for heat dissipation on an outer surface thereof.

19. A reforming apparatus comprising an integrated structure of three separate units, comprising:
- a raw material reforming unit for steam-reforming a raw material to be reformed and producing a reformed gas containing hydrogen as a principal component, including a heat source that generates heat by combustion of a fuel gas, operable to directly obtain heat for the steam reformation reaction from said heat source;
- a shift reaction unit for decreasing, by water-gas-shift reaction, CO contained in the reformed gas produced in said raw material reforming unit; and
- a CO oxidation unit for further decreasing, by oxidation, CO contained in reformed gas treated in said shift reaction unit;
- said raw material reforming unit and said shift reaction unit contain different catalysts, and said shift reaction unit and said CO oxidation unit being arranged in a manner that said shift reaction unit and said CO oxidation unit can be indirectly heated by heat transfer from the heat source of said raw material reforming unit, and further said CO oxidation unit being arranged in a position outside said raw material unit;
- said raw material reforming unit comprising a generally cylindrical combustion chamber as the heat source and a reforming reaction unit for steam-reforming the raw material to produce the reformed gas containing hydrogen as a principal component, said reforming reaction unit, said shift reaction unit and said CO oxidation unit are concentrically arranged relative to said combustion chamber; and
- further comprising a main exhaust chamber in which a burned exhaust gas from said combustion chamber directly flows, a main exhaust vent for directly discharging the burned exhaust gas in said main exhaust chamber to the outside, a shutter for selectively opening and closing said main exhaust vent, a first duct which is separated from said main exhaust chamber and fluid-connected thereto and is positioned outside said main exhaust chamber, and a second duct which is fluid-connected with said first duct and positioned outside said first duct, said shift reaction unit being placed in said first duct, said CO oxidation unit being placed in said second duct.

20. The reforming apparatus according to claim 19, further comprising an exhaust sub-vent for discharging a burned exhaust gas within said first duct to the outside, and a shutter for selectively opening and closing said exhaust sub-vent.

21. The reforming apparatus according to claim 19, wherein at least one of said reforming reaction unit, said shift reaction unit and said CO oxidation unit is formed into a coil-like shape.

22. The reforming apparatus according to claim 19, further comprising an air feed channel for introducing fresh air into said second duct.

23. The reforming apparatus according to claim 1, wherein at least a portion of a raw material feed channel for feeding the raw material and steam to said raw material reforming unit is arranged in a position in which the raw material and the steam are preheated by heat from the heat source of said raw material reforming unit.

24. The reforming apparatus according to claim 23, wherein at least a portion of said raw material feed channel is held in contact with the surface of at least one of said reforming reaction unit, said shift reaction unit add said CO oxidation unit.

25. The reforming apparatus according to claim 23, wherein at least a portion of said raw material feed channel is arranged at a position able to be contacted with the burned exhaust gas from the heat source of said raw material reforming unit.

26. The reforming apparatus according to claim 23, wherein at least a portion of said raw material feed channel is arranged at such a position that it can be directly heated by the heat source of said raw material reforming unit.

27. The reforming apparatus according to claim 1, wherein at least a portion of a fuel feed channel for feeding fuel to the heat source of said raw material reforming unit is arranged at a position able to be preheated by heat from the heat source of said raw material reforming unit.

28. The reforming apparatus according to claim 1, further comprising a combustion catalyst held in said heat source and a preheater for preheating the combustion catalyst, wherein the heat source of said raw material reforming unit generates heat by catalytic combustion.

29. A reforming apparatus comprising an integrated structure of four separate units, which comprises:
- a combustion unit for generating heat by combustion of a fuel gas;
- a raw material reforming reaction unit for steam-reforming a raw material and producing a reformed gas containing hydrogen as a principal component;
- a shift reaction unit for decreasing CO contained in the reformed gas, that was produced in said raw material reforming unit, by water-gas-shift reaction;
- a CO oxidation unit for further decreasing CO contained in the resultant reformed gas, that was treated in said shift reaction unit, by oxidation;
- said reforming reaction unit and said shift reaction unit containing different catalysts, said shift reaction unit and said CO oxidation unit being indirectly heated by heat transfer from the heat source of said raw material reforming unit, said CO oxidation unit being positioned outside said reforming reaction unit, and said reforming reaction unit being directly heated by said combustion unit so that the temperature in said reforming reaction unit is controlled in the range of 400 to 1000° C., said shift reaction unit being indirectly heated by heat transfer from said combustion unit so that the temperature in said shift reaction unit is controlled in the range of 200 to 350° C., said CO oxidation unit being indirectly heated by heat transfer from said combustion unit so that the temperature in said CO oxidation unit is controlled in the range of 100 to 250° C.;
- said CO oxidation unit including an outside surface, and being arranged to obtain atmospheric cooling of the outside surface; and
- said raw material reforming unit, said shift reaction unit and said CO oxidization unit are concentrically arranged relative to each other with said CO oxidization unit placed on an outer peripheral side of the reforming apparatus.

* * * * *